US008819745B2

(12) United States Patent
Sizelove et al.

(10) Patent No.: US 8,819,745 B2
(45) Date of Patent: Aug. 26, 2014

(54) MEDIA DEVICE INTERFACE SYSTEM AND METHOD FOR VEHICLE INFORMATION SYSTEMS

(75) Inventors: Steven Sizelove, Woodinville, WA (US); Cedric Rhoads, Trabuco Canyon, CA (US); Brian Kirby, Lynnwood, WA (US)

(73) Assignee: Panasonic Avionics Corporation, Lake Forest, CA (US)

( * ) Notice: Subject to any disclaimer, the term of this patent is extended or adjusted under 35 U.S.C. 154(b) by 642 days.

(21) Appl. No.: 12/210,652

(22) Filed: Sep. 15, 2008

(65) Prior Publication Data

US 2009/0077595 A1     Mar. 19, 2009

Related U.S. Application Data

(60) Provisional application No. 60/972,383, filed on Sep. 14, 2007, provisional application No. 60/972,648, filed on Sep. 14, 2007, provisional application No. 60/972,689, filed on Sep. 14, 2007.

(51) Int. Cl.
| | |
|---|---|
| *H04N 7/18* | (2006.01) |
| *H04N 21/436* | (2011.01) |
| *G06F 1/16* | (2006.01) |
| *H04N 21/414* | (2011.01) |
| *H04N 21/4363* | (2011.01) |
| *H04N 21/41* | (2011.01) |
| *H04L 29/08* | (2006.01) |
| *B64D 11/06* | (2006.01) |

(52) U.S. Cl.
CPC ........ *G06F 1/1632* (2013.01); *H04N 21/43615* (2013.01); *G06F 1/1626* (2013.01); *H04N 21/41422* (2013.01); *H04N 7/18* (2013.01); *H04N 21/43637* (2013.01); *B64D 2011/0637* (2013.01); *G06F 1/1698* (2013.01); *H04N 21/4126* (2013.01); *G06F 1/1656* (2013.01); *H04L 67/12* (2013.01)
USPC .................. 725/76; 725/74; 725/75; 725/77; 439/38; 439/39; 439/40

(58) Field of Classification Search
USPC ................................... 725/74–85; 439/38–40
See application file for complete search history.

(56) References Cited

U.S. PATENT DOCUMENTS

| | | | |
|---|---|---|---|
| 3,037,812 | A | 6/1962 | Monroe |
| 4,584,603 | A | 4/1986 | Harrison |

(Continued)

FOREIGN PATENT DOCUMENTS

| | | |
|---|---|---|
| CN | 1104160 A | 6/1995 |
| CN | ZL200520103236.4 | 12/2006 |

(Continued)

OTHER PUBLICATIONS

US Office Action, U.S. Appl. No. 10/772,565, Jan. 4, 2011.

(Continued)

*Primary Examiner* — Yassin Alata
(74) *Attorney, Agent, or Firm* — Orrick, Herrington & Sutcliffe LLP

(57) ABSTRACT

An information system suitable for use in cooperation with portable media devices, such as an Apple iPod® digital electronic media device, and methods for manufacturing and using same. The information system supports a simple manner for seamlessly integrating the personal media device with the information system, immersing a user in a rich and intuitive media environment. When the personal media device and the information system are coupled, viewing content from the personal media device can be integrated "on the fly" into the information system via an interactive user interface system. The personal media device likewise can receive control commands and/or operating power from the information system. Thereby, the user can advantageously enjoy his own personal viewing content from the personal media device via the larger video presentation system and/or the enhanced audio presentation system of the information system, while recharging an internal battery system of the personal media device.

50 Claims, 17 Drawing Sheets

(56) References Cited

U.S. PATENT DOCUMENTS

| | | | |
|---|---|---|---|
| 4,866,515 A | 9/1989 | Tagawa et al. |
| 4,897,714 A | 1/1990 | Ichise et al. |
| 5,177,616 A | 1/1993 | Riday |
| 5,295,089 A | 3/1994 | Ambasz |
| 5,311,302 A | 5/1994 | Berry et al. |
| 5,469,363 A | 11/1995 | Saliga |
| 5,555,466 A | 9/1996 | Scribner et al. |
| 5,568,484 A | 10/1996 | Margis |
| 5,596,647 A | 1/1997 | Wakai et al. |
| 5,617,331 A | 4/1997 | Wakai et al. |
| 5,640,002 A | 6/1997 | Ruppert et al. |
| 5,701,582 A | 12/1997 | DeBey |
| 5,709,448 A | 1/1998 | Jennings et al. |
| 5,760,819 A | 6/1998 | Sklar et al. |
| 5,790,175 A | 8/1998 | Sklar et al. |
| 5,790,787 A | 8/1998 | Scott et al. |
| 5,831,664 A | 11/1998 | Wharton et al. |
| 5,835,127 A | 11/1998 | Booth et al. |
| 5,857,869 A | 1/1999 | Parcel et al. |
| 5,889,268 A | 3/1999 | Swartz |
| 5,889,775 A | 3/1999 | Sawicz et al. |
| 5,953,429 A | 9/1999 | Wakai et al. |
| 5,959,596 A | 9/1999 | McCarten et al. |
| 5,966,442 A | 10/1999 | Sachdev |
| 5,973,722 A | 10/1999 | Wakai et al. |
| 5,990,928 A | 11/1999 | Sklar et al. |
| 6,003,008 A | 12/1999 | Postrel et al. |
| 6,058,288 A | 5/2000 | Reed et al. |
| 6,129,274 A | 10/2000 | Suzuki |
| 6,135,549 A | 10/2000 | Demick et al. |
| 6,151,497 A | 11/2000 | Yee et al. |
| 6,154,186 A | 11/2000 | Smith et al. |
| 6,177,887 B1 | 1/2001 | Jerome |
| 6,201,797 B1 | 3/2001 | Leuca et al. |
| 6,208,307 B1 | 3/2001 | Frisco et al. |
| 6,249,913 B1 | 6/2001 | Galipeau et al. |
| 6,338,045 B1 | 1/2002 | Pappas |
| 6,390,920 B1 | 5/2002 | Infiesto et al. |
| 6,487,540 B1 | 11/2002 | Smith et al. |
| 6,499,027 B1 | 12/2002 | Weinberger |
| 6,507,279 B2 | 1/2003 | Loof |
| 6,507,952 B1 | 1/2003 | Miller et al. |
| 6,519,693 B1 | 2/2003 | Debey |
| 6,529,706 B1 | 3/2003 | Mitchell |
| 6,549,754 B1 | 4/2003 | Miller et al. |
| 6,559,812 B1 | 5/2003 | McCarten et al. |
| 6,574,338 B1 | 6/2003 | Sachdev |
| 6,598,227 B1 | 7/2003 | Berry et al. |
| 6,600,418 B2 | 7/2003 | Sainati et al. |
| 6,609,103 B1 | 8/2003 | Kolls |
| 6,622,124 B1 | 9/2003 | Kolls |
| 6,637,484 B1 | 10/2003 | Kraft |
| 6,643,510 B2 | 11/2003 | Taylor |
| 6,661,353 B1 | 12/2003 | Gopen |
| 6,693,236 B1 | 2/2004 | Gould et al. |
| 6,702,604 B1 | 3/2004 | Moscovitch |
| 6,736,315 B2 | 5/2004 | Swartz |
| 6,757,712 B1 | 6/2004 | Bastian et al. |
| 6,796,495 B2 | 9/2004 | Stahl et al. |
| 6,810,527 B1 | 10/2004 | Conrad et al. |
| 6,876,905 B2 | 4/2005 | Farley et al. |
| 6,899,390 B2 | 5/2005 | Sanfrod et al. |
| 6,990,338 B2 | 1/2006 | Miller et al. |
| 7,036,889 B2 | 5/2006 | Sanfrod et al. |
| 7,100,187 B2 | 8/2006 | Pierzga et al. |
| 7,124,426 B1 | 10/2006 | Tsuria et al. |
| 7,177,638 B2 | 2/2007 | Funderburk et al. |
| 7,280,825 B2 | 10/2007 | Keen et al. |
| 7,454,203 B2 | 11/2008 | Levitan |
| 7,483,696 B1 | 1/2009 | Mitchell |
| 7,496,361 B1 | 2/2009 | Mitchell et al. |
| 2002/0059363 A1 | 5/2002 | Katz et al. |
| 2002/0094829 A1 | 7/2002 | Ritter |
| 2002/0095680 A1 | 7/2002 | Davidson |
| 2002/0152470 A1 | 10/2002 | Hammond |
| 2002/0178451 A1 | 11/2002 | Ficco |
| 2003/0003899 A1 | 1/2003 | Tashiro et al. |
| 2003/0107248 A1 | 6/2003 | Sanford et al. |
| 2003/0148736 A1 | 8/2003 | Wright et al. |
| 2004/0077308 A1 | 4/2004 | Sanford et al. |
| 2004/0098745 A1 | 5/2004 | Marston et al. |
| 2004/0167967 A1 | 8/2004 | Bastian et al. |
| 2004/0183346 A1 | 9/2004 | Sanford et al. |
| 2005/0044564 A1 | 2/2005 | Stopniewicz |
| 2005/0132407 A1 | 6/2005 | Boyer, Jr. et al. |
| 2005/0177763 A1 | 8/2005 | Stoler |
| 2005/0193257 A1 | 9/2005 | Stoler |
| 2005/0202785 A1 | 9/2005 | Meyer |
| 2005/0216938 A1 | 9/2005 | Brady et al. |
| 2005/0239261 A1 | 10/2005 | Tai et al. |
| 2005/0239434 A1* | 10/2005 | Marlowe ................ 455/345 |
| 2005/0256616 A1 | 11/2005 | Rhoads |
| 2005/0268319 A1 | 12/2005 | Brady, Jr. |
| 2006/0032979 A1 | 2/2006 | Mitchell et al. |
| 2006/0088001 A1 | 4/2006 | Reitmann et al. |
| 2006/0107295 A1* | 5/2006 | Margis et al. ............ 725/81 |
| 2006/0174285 A1 | 8/2006 | Brady et al. |
| 2006/0212909 A1 | 9/2006 | Girard et al. |
| 2006/0217121 A1 | 9/2006 | Soliman et al. |
| 2006/0234700 A1 | 10/2006 | Funderburk et al. |
| 2006/0270373 A1 | 11/2006 | So |
| 2006/0277589 A1 | 12/2006 | Margis et al. |
| 2006/0291803 A1 | 12/2006 | Watson et al. |
| 2006/0293190 A1 | 12/2006 | Watson et al. |
| 2007/0022018 A1 | 1/2007 | Suryanarayana et al. |
| 2007/0044126 A1 | 2/2007 | Mitchell |
| 2008/0023600 A1 | 1/2008 | Perlman |
| 2008/0040756 A1 | 2/2008 | Perlman |
| 2008/0124054 A1 | 5/2008 | Bonar |
| 2008/0127278 A1 | 5/2008 | Bonar |
| 2008/0311765 A1* | 12/2008 | Chatterjee et al. ............ 439/38 |
| 2009/0007193 A1 | 1/2009 | Correa et al. |
| 2009/0042651 A1 | 2/2009 | Prabhu et al. |

FOREIGN PATENT DOCUMENTS

| | | |
|---|---|---|
| EP | 0577054 A | 1/1994 |
| EP | 1 231 534 A1 | 8/2002 |
| JP | 58-46485 | 3/1983 |
| JP | 62-238693 | 10/1987 |
| JP | H06-285259 A | 10/1994 |
| JP | H09-512401 A | 11/1995 |
| JP | 2003-534959 A | 4/2000 |
| JP | 2003-140804 A | 5/2003 |
| JP | 2006527540 A | 1/2005 |
| JP | 2005-045490 A | 2/2005 |
| JP | 2005-528030 A | 9/2005 |
| WO | WO 00/14987 | 3/2000 |
| WO | WO 03/024110 A1 | 3/2003 |
| WO | WO 03/032503 A | 4/2003 |
| WO | WO 03/032503 A2 | 4/2003 |
| WO | WO 03/050000 A1 | 6/2003 |
| WO | WO 2004/003696 A2 | 1/2004 |
| WO | WO 2004/008277 A2 | 1/2004 |
| WO | WO 2005/120068 A3 | 12/2005 |
| WO | WO 2006/062641 A2 | 6/2006 |
| WO | WO 2006/065381 A2 | 6/2006 |

OTHER PUBLICATIONS

US Office Action, U.S. Appl. No. 10/772,565, Jul. 7, 2010.
US Office Action, U.S. Appl. No. 10/772,565, Nov. 24, 2009.
US Notice of Allowance and Fees Due, U.S. Appl. No. 11/277,896, Oct. 23, 2009.
US Office Action, U.S. Appl. No. 11/123,327, Oct. 14, 2009.
US Office Action, U.S. Appl. No. 11/123,327, Jul. 20, 2010.
US Office Action, U.S. Appl. No. Oct. 26, 2009.
US Notice of Allowance and Fees Due, U.S. Appl. No. 11/154,749, Feb. 17, 2011.
US Office Action, U.S. Appl. No. 11/154,749, Jun, 7, 2010.
US Office Action, U.S. Appl. No. 11/379,360, Aug. 25, 2010.
US Office Action, U.S. Appl. No. 11/379,360, Nov. 23, 2009.
US Office Action, U.S. Appl. No. 11/828,193, Nov. 30, 2009.

(56) References Cited

OTHER PUBLICATIONS

CN Office Action, Appl. No. 200780029616.X, Aug. 6, 2010.
Ibenthal A. et al: Multimedia Im Fahrzeug: Dienste Und Technik, Mar. 2000, Fernseh Und Kinotechnik, Vde Verlad GMBH. Berlin, De, pp. 100-105, XP000966339 ISSN: 0015-014.
Chen Y. et al., Personalized Multimedia Services Using A Mobile Service Platform, 2002 IEEE, 0-7803-7376-6/02, Mar. 17, 2002, pp. 918-925.
Gratschew, S., et al., A Multimedia Messaging Platform for Content Delivering, 2003 IEEE, 0-7803-7661-7/03, Feb. 23, 2003, pp. 431-435.
US Office Action, U.S. Appl. No. 10/773,523, Oct. 5, 2006.
US Office Action, U.S. Appl. No. 09/952,629, Mar. 14, 2006.
US Office Action, U.S. Appl. No. 09/952,629, Dec. 1, 2006.
US Office Action, U.S. Appl. No. 09/952,629, Jun. 27, 2007.
US Office Action, U.S. Appl. No. 09/952,629, Oct. 27, 2008.
US Office Action, U.S. Appl. No. 09/952,629, Mar. 18, 2008.
US Office Action, U.S. Appl. No. 09/952,629, Jun. 2, 2009.
US Office Action, U.S. Appl. No. 09/811,317, Feb. 28, 2002.
US Office Action, U.S. Appl. No. 09/811,317, Aug. 13, 2002.
US Office Action, U.S. Appl. No. 09/811,317, Dec. 30, 2002.
US Notice of Allowance and Fees due, U.S. Appl. No. 09/811,317, Jul. 14, 2003.
US Office Action, U.S. Appl. No. 08/863,448, Sep. 24, 1997.
US Office Action, U.S. Appl. No. 08/863,448, Apr. 27, 1998.
US Notice of Allowance, U.S. Appl. No. 08/863,448, Feb. 17, 1999.
US Office Action, U.S. Appl. No. 08/479,654, Jan. 24, 1997.
US Office Action, U.S. Appl. No. 08/479,654, Aug. 21, 1995.
US Office Action, U.S. Appl. No. 08/479,654, Mar. 1, 1996.
US Office Action, U.S. Appl. No. 08/479,654, Aug. 5, 1997.
US Office Action, U.S. Appl. No. 08/071,218, Dec. 7, 1994.
US Office Action, U.S. Appl. No. 08/071,218, Apr. 20, 1995.
US Notice of Allowance and Fees due, U.S. Appl. No. 08/071,218, Aug. 7, 1995.
US Office Action, U.S. Appl. No. 08/480,666, Feb. 9, 1996.
US Notice of Allowance and Fees due, U.S. Appl. No. 08/480,666, Sep. 5, 1996.
US Office Action, U.S. Appl. No. 08/480,666, Oct. 16, 1996.
US Office Action, U.S. Appl. No. 08/480,666, Nov. 22, 1996.
JP Office Action, 2004-199893, Jul. 5, 2005.
JP Office Action, 2006-000840, Feb. 28, 2007.
US Office Action, U.S. Appl. No. 08/363,228, Oct. 3, 1995.
US Office Action, U.S. Appl. No. 08/363,228, Mar. 27, 1996.
US Notice of Allowance and Fees due, U.S. Appl. No. 08/363,228, Apr. 9, 1996.
US Office Action, U.S. Appl. No. 10/772,565, Mar. 4, 2009.
PCT International Search Report, PCT/US2004/017666, Apr. 2, 2005.
EP Communication, App. No. 04754296.4-1241, Apr. 4, 2007.
AU First Report, App No. 2004251677, Sep. 26, 2008.
US Office Action, U.S. Appl. No. 11/123,327, Dec. 11, 2008.
PCT International Search Report, PCT/US2005/016513, Aug. 9, 2005.
PCT International Preliminary Report, PCT/US2005/016513, Nov. 16, 2006.
EP Communication, App. No. 05 749 692.9-1525, Jun. 15, 2007.
EP Communication, App. No. 05 749 692.9-1525, Oct. 22, 2008.
US Office Action, U.S. Appl. No. 11/154,749, Aug. 18, 2008.
US Office Action, U.S. Appl. No. 11/154,749, Jan. 23, 2009.
PCT International Search Report, PCT/US2005/021518, Jan. 3, 2006.
PCT International Preliminary Report, PCT/US2005/021518, Jan. 4, 2007.
EP Communication, App. No. 05 762 201.1-2202, May 18, 2007.
EP Communication, App. No. 05 762 201.1-2202, Jul. 18, 2008.
US Office Action, U.S. Appl. No. 11/269,378, Aug. 20, 2008.
US Office Action, U.S. Appl. No. 11/269,378, Apr. 28, 2009.
PCT International Search Report, PCT/US2005/040380, Mar. 15, 2006.
PCT International Preliminary Report, PCT/US2005/040380, May 18, 2007.
US Office Action, U.S. Appl. No. 11/277,896, Apr. 14, 2009.
PCT International Search Report, PCT/US2006/012067, Aug. 9, 2006.
PCT International Preliminary Report, PCT/US2006/012067, Oct. 11, 2007.
EP Communication, App. No. 06 740 274.3-2416, Jan. 31, 2008.
EP Communication, App. No. 06 740 274.3-2416, Sep. 17, 2008.
EP Notice of Intention to Grant, App. No. 06 740 274.3-2416, Mar. 20, 2009.
US Office Action, U.S. Appl. No. 11/379,360, Apr. 3, 2009.
PCT International Search Report, PCT/US2006/014852, Dec. 4, 2006.
PCT International Preliminary Report, PCT/US2006-014852, Nov. 1, 2007.
PCT International Search Report, PCT/US2007/074367, Dec. 17, 2007.
PCT International Preliminary Report, PCT/US2007/074367, Feb. 5, 2009.
EP Communication, App. No. 07 813 357.6-1523, Sep. 29, 2009.
PCT International Search Report, PCT/US2007/075448, Jul. 4, 2008.
PCT International Search Report, PCT/US2008/076281, Jan. 13, 2009.
PCT International Search Report, PCT/US2008/076285, Dec. 30, 2008.
PCT International Search Report, PCT/US2008/076294, Dec. 29, 2008.
Y.F. Chen, et al., "Personalized Multimedia Services Using a Mobile Service Platform", IEEE 2002, pp. 918-215.
S. Gratschew, et al., "A Multimedia Messaging Platform for Content Delivering", IEEE 2003, pp. 431-435.
A. Ibenthal, et al.,"Multimedia im Fahrzeug: Dienste und Technik", Fernseh und Kino-Technik 54, Jahrgang Nr. Mar. 2000, pp. 100-105.
KR Office Action, Sep. 16, 2011.
EP Office Action, EP Application No. 08 830 787.1, Dec. 9, 2011.
CN Office Action, Appl. No. 200880107132.7, Jul. 22. 2011.
CN Office Action, CN Appln No. 200880115267.8, Dec. 24, 2012.
JP Office Action, JP Appln. No. 2010-525047, Dec. 25, 2012.
EP EP Exam Report, EP Appln No. 05823171.3, Feb. 6, 2013.
JP Office Action, JP Appln No. 2010-525045, Mar. 5, 2013.
JP Office Action, JP Appln No. 2010-525046, Mar. 5, 2013.
CN Office Action, CN Appln No. 20880107089.4, Mar. 7, 2013.
CN Office Action, CN Appln No. 200880115267.8, Jul. 8, 2013.
CN Office Action, CN Appln No. 200880107132.7, Dec. 16, 2013.
JP Office Action, Japanese Application No. 2009-523977, Jul. 17, 2012.
CN Office Action, Chinese Application No. 200780029616.X, Nov. 2, 2012.
CN Office Action, Chinese Application No. 200880107132.7, Jun. 7, 2013.
CN Office Action, CN Appln No. 200780029616.X, Apr. 17, 2013.
JP Office Action, JP Appln No. 2010-525043, May 7, 2013.

* cited by examiner

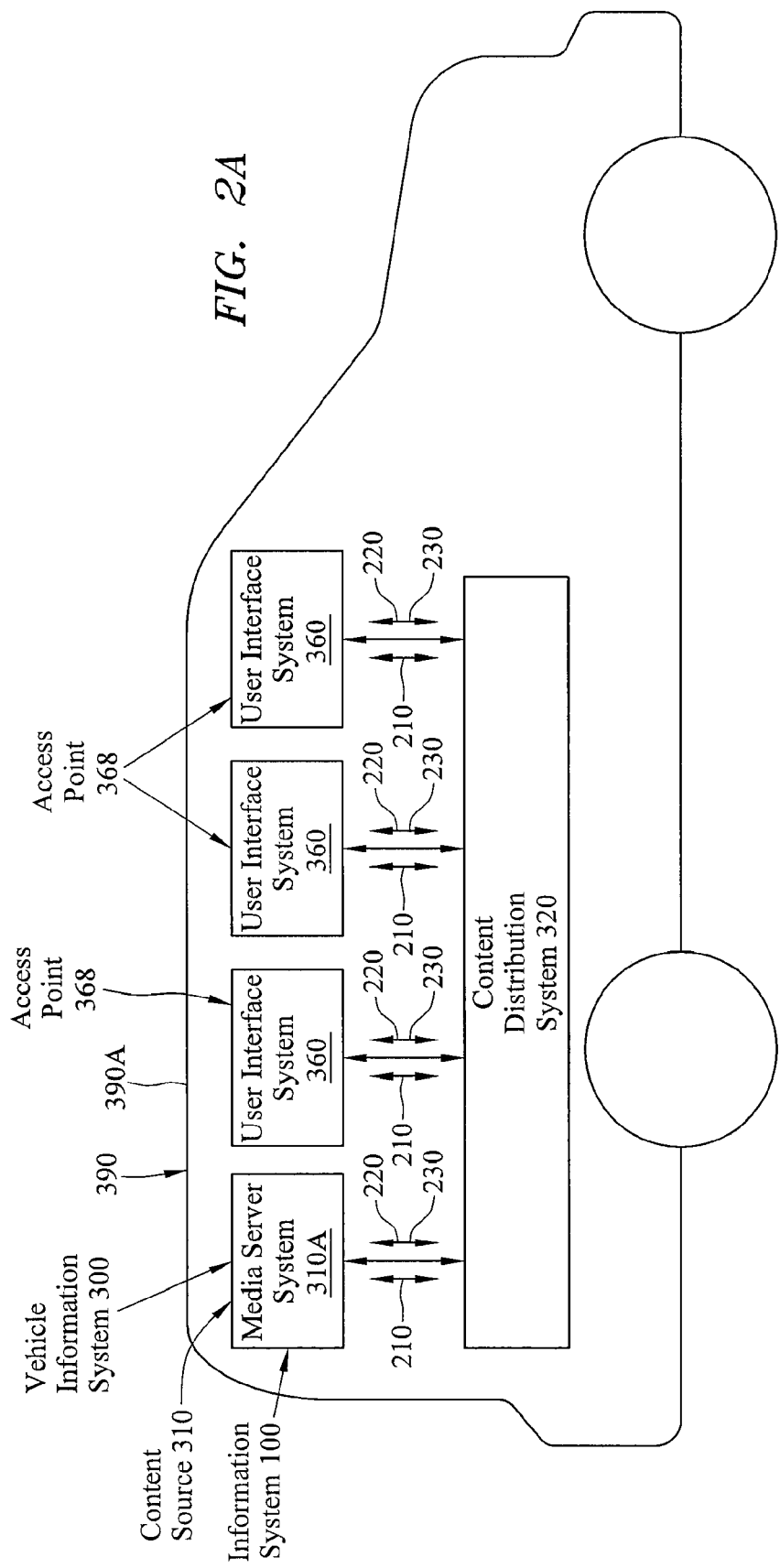

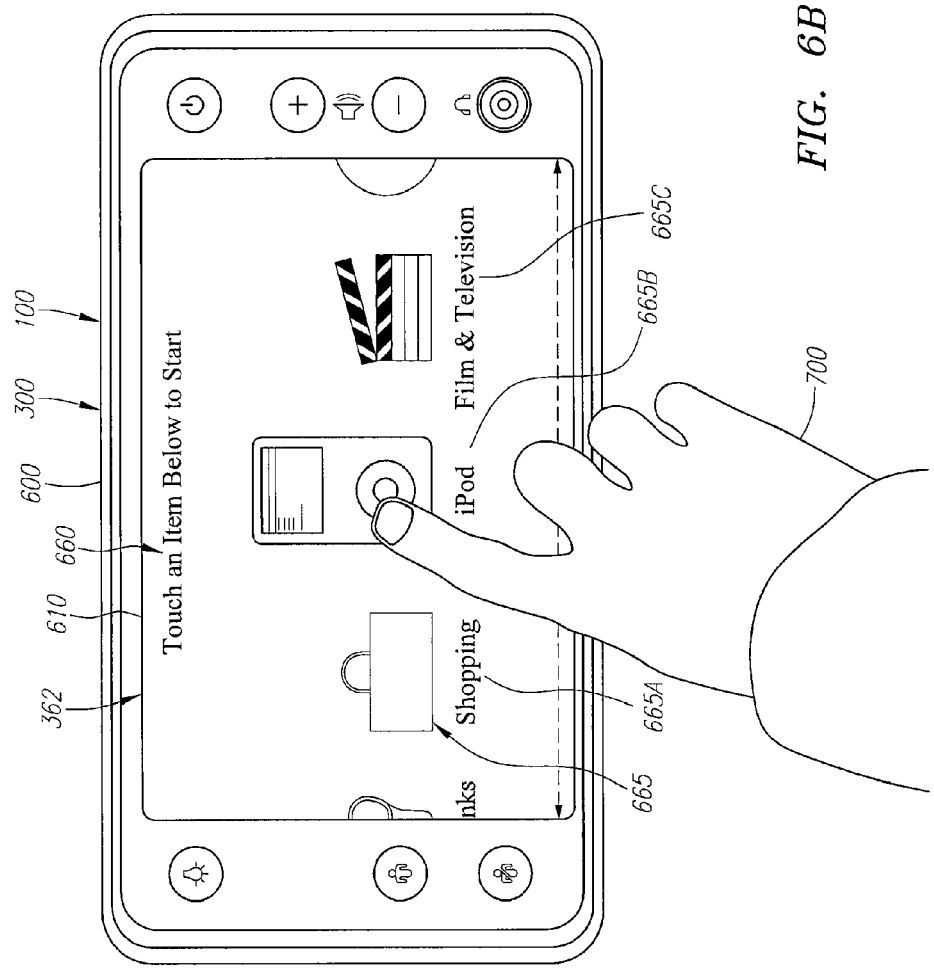

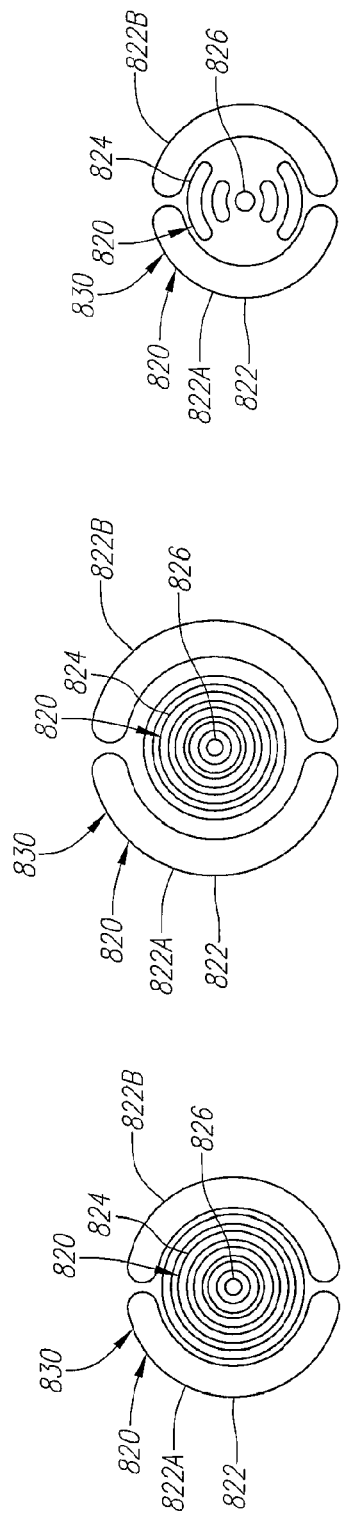
FIG. 8A
FIG. 8B
FIG. 8C
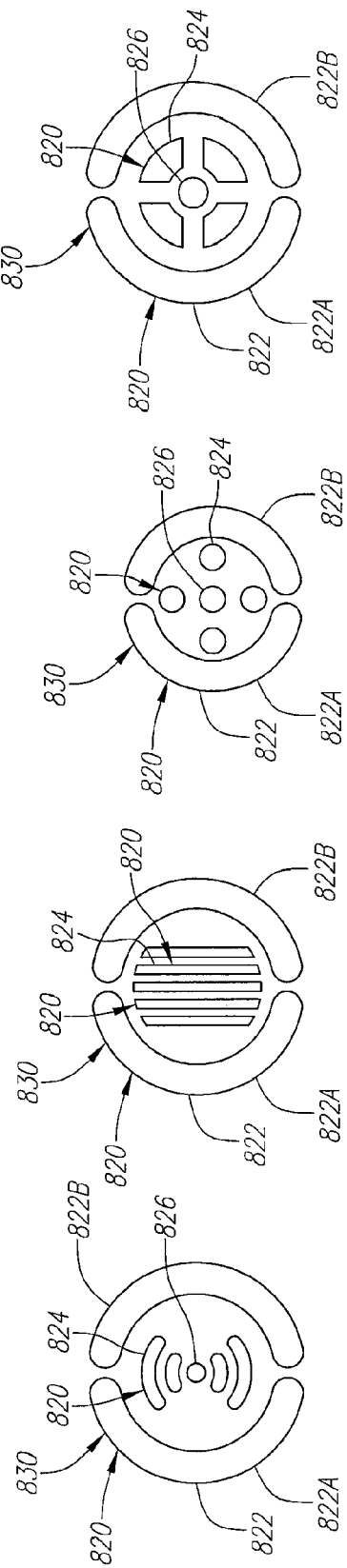
FIG. 8D
FIG. 8E
FIG. 8F
FIG. 8G

MEDIA DEVICE INTERFACE SYSTEM AND METHOD FOR VEHICLE INFORMATION SYSTEMS

CROSS-REFERENCE TO RELATED APPLICATIONS

This application claims priority to each of the following provisional patent applications: U.S. provisional patent application, Ser. No. 60/972,383, filed on Sep. 14, 2007; U.S. provisional patent application, Ser. No. 60/972,648, filed on Sep. 14, 2007; and U.S. provisional patent application, Ser. No. 60/972,689, filed on Sep. 14, 2007. Priority to each of the provisional patent applications is expressly claimed, and the disclosures of the provisional applications are hereby incorporated herein by reference in their entireties and for all purposes.

CROSS-REFERENCE TO RELATED NONPROVISIONAL APPLICATIONS

The following United States nonprovisional patent applications are fully owned by the assignee of the present application and are filed on the same date herewith. The disclosure of the nonprovisional patent applications are hereby incorporated herein by reference in their entireties and for all purposes:

"SYSTEM AND METHOD FOR INTERFACING A PORTABLE MEDIA DEVICE WITH A VEHICLE INFORMATION SYSTEM," Ser. No. 12/210,624, filed Sep. 15, 2008;

"MEDIA DEVICE INTERFACE SYSTEM AND METHOD FOR VEHICLE INFORMATION SYSTEMS," Ser. No. 12/210,636, filed Sep. 15, 2008; and "PORTABLE USER CONTROL DEVICE AND METHOD FOR VEHICLE INFORMATION SYSTEMS," Ser. No. 12/210,689, filed Sep. 15, 2008.

FIELD

The present disclosure relates generally to interface systems and more particularly, but not exclusively, to systems suitable for interfacing personal media devices with vehicle information systems installed aboard passenger vehicles.

BACKGROUND

Vehicles, such as automobiles and aircraft, often include vehicle information systems for satisfying passenger demand for access to viewing content, such as entertainment, information content, or other viewing content, while traveling.

Conventional passenger information (or entertainment) systems typically include overhead cabin video systems or seat-based video systems with individual controls such that viewing content is selectable by the passengers. The viewing content can include audio and video content that is derived from a variety of content sources. Prerecorded viewing content, such as motion pictures and music, can be provided by internal content sources, such as audio and video players, that are installed aboard the vehicle. The conventional passenger information systems likewise can include an antenna system for receiving viewing content, such as live television programming and/or Internet content, transmitted from one or more content providers (or sources) that are external to, and/or remote from, the vehicle.

Such conventional passenger information systems, however, suffer from numerous disadvantages. Some passengers find the passenger information systems to be complicated to operate and the viewing content difficult to enjoy. Selection of the viewing content, for example, can prove difficult due to the awkward placement and operation of the user controls. Similarly, the video systems of the passenger information systems typically are located distally from the passenger controls, such as overhead and/or on an opposing seatback. In addition, some or all of the passengers traveling aboard the vehicle can be inhibited from enjoying the viewing content if one or more of the video systems fails. Conventional passenger information systems further require a plurality of interface points and multiple cables, such as left audio, right audio, video, data, and/or power, for communicating with passengers' handheld personal media devices and do not support remote control for these personal media devices. Such system shortcomings are a frequent source of passenger complaints during travel.

Further, passenger demand for viewing content is continually evolving. Not only do passengers want to access the most current viewing content, such as live television programming and the latest games, but they also require a more extensive selection of information products and services, such as Internet access and in-transit shopping, to be available. Passengers likewise wish to view their own personally-provided viewing content, such as photo albums and/or music selections, during travel. Conventional passenger information systems, however, are limited by their fixed hardware technology and cannot easily be adapted to accommodate changing passenger viewing content and other information preferences.

In view of the foregoing, a need exists for an improved passenger information system and method for integrating passengers' personal media devices into the passenger information system in an effort to overcome the aforementioned obstacles and deficiencies of conventional passenger information systems.

BRIEF DESCRIPTION OF THE DRAWINGS

FIG. 2A is an exemplary top-level drawing illustrating the information system of FIG. 1, wherein the information system comprises a vehicle information system installed aboard an automobile.

FIG. 6B is an exemplary detail drawing illustrating an embodiment of the integrated audio/video presentation system of FIG. 6A, wherein the integrated audio/video presentation system supports selection of viewing content provided by the iPod® digital electronic media device and viewing content provided by the vehicle information system.

FIG. 8A is an exemplary detail drawings illustrating an embodiment of a system contact arrangement of the break-away communication connector system of FIGS. 7A-B, wherein the system contacts are provided in a concentric (or bull's eye) contact arrangement.

FIG. 8B is an exemplary detail drawings illustrating an alternative embodiment of the contact arrangement of FIG. 8A, wherein a spacing between adjacent system contacts is not uniform.

FIG. 8C is an exemplary detail drawings illustrating another alternative embodiment of the contact arrangement of FIG. 8A, wherein the system contacts are provided as semicircles.

FIG. 8D is an exemplary detail drawings illustrating an alternative embodiment of the contact arrangement of FIG. 8C, wherein a spacing between adjacent system contacts is not uniform.

FIG. 8E is an exemplary detail drawings illustrating another alternative embodiment of the contact arrangement of FIG. 8A, wherein the system contacts include an arrangement of straight system contacts.

FIG. 8F is an exemplary detail drawings illustrating another alternative embodiment of the contact arrangement of FIG. 8A, wherein the system contacts include an arrangement of round contacts.

FIG. 8G is an exemplary detail drawings illustrating another alternative embodiment of the contact arrangement of FIG. 8A, wherein the system contacts include an arrangement of pie-shaped contacts.

Figure 1:
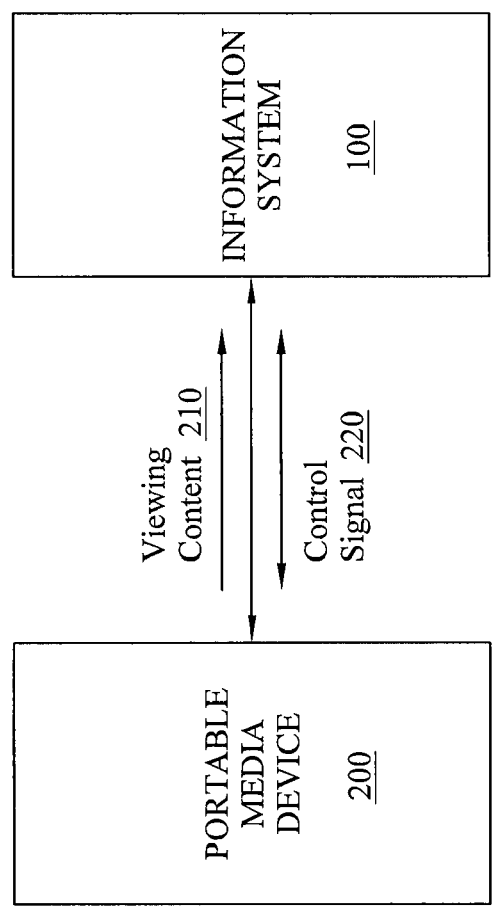
FIG. 1 is an exemplary top-level drawing illustrating an embodiment of an interface system for interfacing a personal media device with an information system.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION OF THE PREFERRED EMBODIMENTS

Since currently-available passenger information systems are complicated to operate, limited by fixed hardware technology, and cannot easily be adapted to accommodate changing passenger viewing content and other information preferences, an information system that includes at least one communication interface for enabling communication with a personal media device can prove desirable and provide a basis for a wide range of system applications, such as vehicle information systems for use aboard automobiles, aircraft, and other types of vehicles during travel. This result can be achieved, according to one embodiment disclosed herein, by an information system 100 as illustrated in FIG. 1.

Turning to FIG. 1, the information system 100 is shown as being configured for use with a personal (or portable) media device 200. The information system 100 supports a simple manner for permitting the personal media device 200 to be seamlessly integrated with the information system 100, immersing a user (or passenger) 700 (shown in FIG. 6B) in a rich and intuitive media environment. When the personal media device 200 and the information system 100 are coupled, viewing content 210 from the personal media device 200 can be integrated "on the fly" into the information system 100 via an interactive audio/video presentation system 600 (shown in FIGS. 6A-F). The audio/video presentation system 600 can be provided with any suitable branding indicia. The information system 100 thereby provides the user 700 with an ability to switch easily between viewing content 210 provided by the information system 100 and the viewing content 210 from the personal media device 200.

Operation of the personal media device 200 can be controlled in any conventional manner, including directly via a user control system 260 (shown in FIGS. 5A-B) of the personal media device 200 and/or indirectly via an input system 366 (shown in FIGS. 4A-B) associated with the information system 100. Viewing content 210 thereby can be selected from audio and/or video viewing content stored internally within the personal media device 200 and can be communicated from the personal media device 200 to the information system 100 for presentation via a video presentation system 362 (shown in FIGS. 4A-B) and/or an audio presentation system 364 (shown in FIGS. 4A-B) of the information system 100. The personal media device 200 likewise can exchange control signals (or commands) 220, such as user control signals (or user control instructions) 230 (shown in FIGS. 4A-B), with, and/or receive operating power 220P (shown in FIGS. 7A-B) from, the information system 100. Thereby, the user 700 can advantageously enjoy his own personal viewing content 210 from the personal media device 200 via the larger video presentation system 362 and/or the enhanced audio presentation system 364 of the information system 100, while an internal battery system (not shown) of the personal media device 200 is being recharged.

The personal media device 200 can store the audio and/or video viewing content 210 and can be provided as a handheld device, such as a laptop computer, a palmtop computer, a personal digital assistant (PDA), cellular telephone, and/or a MPEG Audio Layer 3 (MP3) device. Illustrative personal media devices 200 are shown and described in the co-pending United States patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005, which are assigned to the assignee of the present application and the respective disclosures of which are hereby incorporated herein by reference in their entireties. Preferably, the personal media device 200 is provided as an iPod® digital electronic media device and/or an iPhone® digital electronic media device each as manufactured by Apple Computer, Inc., of Cupertino, Calif.

The viewing content 210 can comprise any conventional type of audio and/or video viewing content, such as stored (or time-delayed) viewing content and/or live (or real-time) viewing content, in the manner set forth in the above-referenced co-pending United States patent applications, entitled "SYSTEM AND METHOD FOR DOWNLOADING FILES," Ser. No. 10/772,565, filed on Feb. 4, 2004; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005. Exemplary viewing content 210 can include television programming content, music content, podcast content, photograph album content, audiobook content, movie content, and/or game content without limitation.

As desired, the viewing content 210 can include geographical information in the manner set forth in U.S. Pat. No. 6,661,353, entitled "METHOD FOR DISPLAYING INTERACTIVE FLIGHT MAP INFORMATION," which is assigned to the assignee of the present application and the disclosure of which is hereby incorporated herein by reference in its entirety. Alternatively, and/or additionally, to entertainment content, such as live satellite television programming and/or live satellite radio programming, the viewing content likewise can include two-way communications, such as real-time access to the Internet 310C (shown in FIG. 2B) and/or telecommunications in the manner set forth in U.S. Pat. No. 5,568,484, entitled "TELECOMMUNICATIONS SYSTEM AND METHOD FOR USE ON COMMERCIAL AIRCRAFT AND OTHER VEHICLES," which is assigned to the assignee of the present application and the disclosure of which is hereby incorporated herein by reference in its entirety. The exemplary viewing content as shown and described herein are not exhaustive and are provided herein for purposes of illustration only and not for purposes of limitation.

Figure 2B:
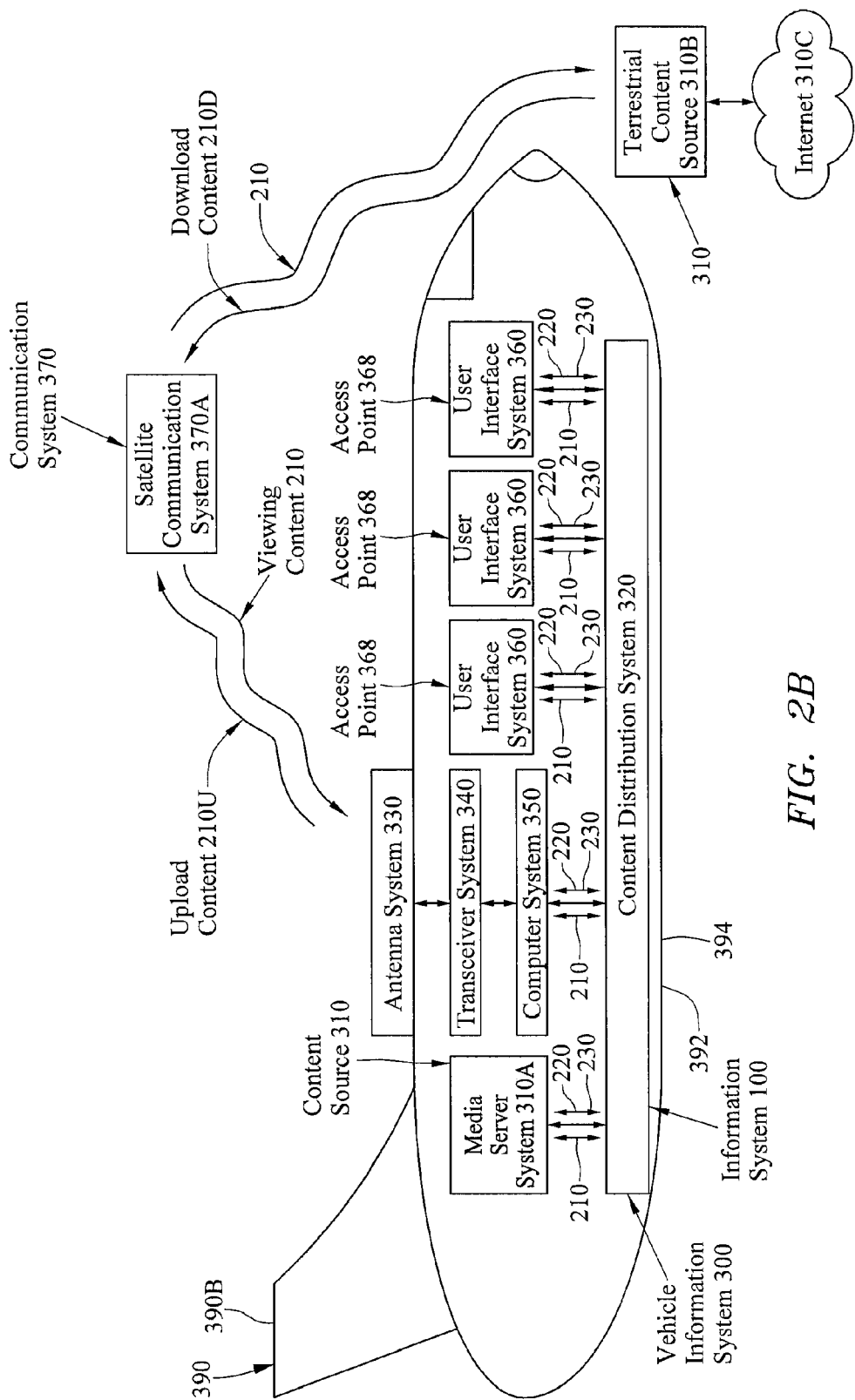
FIG. 2B is an exemplary top-level drawing illustrating the vehicle information system of FIG. 2A, wherein the vehicle information system is installed aboard an aircraft.

Although the information system 100 can be disposed in a fixed location, such as a building, the information system 100 likewise can advantageously be applied in portable system applications. Turning to FIGS. 2A-B, the information system 100 is shown as comprising a vehicle information system 300 that can be configured for installation aboard a wide variety of vehicles 390. Exemplary types of vehicles can include an automobile 390A (shown in FIG. 2A), an aircraft 390B (shown in FIG. 2B), a bus, a recreational vehicle, a boat, and/or a locomotive, or any other type of passenger vehicle without limitation. If installed on an aircraft 390B as illustrated in FIG. 2B, for example, the vehicle information system 300 can comprise a conventional aircraft passenger in-flight entertainment system, such as the Series 2000, 3000, eFX, and/or eX2 in-flight entertainment system as manufactured by Panasonic Avionics Corporation (formerly known as Matsushita Avionics Systems Corporation) of Lake Forest, Calif.

As shown in FIGS. 2A-B, the vehicle information system 300 comprises at least one conventional content source 310 and one or more user (or passenger) interface systems 360 that communicate via a real-time content distribution system 320. Each content source 310 can be provided in the manner set forth in the co-pending United States patent applications, entitled "SYSTEM AND METHOD FOR DOWNLOADING FILES," Ser. No. 10/772,565, filed on Feb. 4, 2004; entitled "SYSTEM AND METHOD FOR MANAGING CONTENT ON MOBILE PLATFORMS," Ser. No. 11/123,327, filed on May 6, 2005; entitled "PORTABLE MEDIA DEVICE AND METHOD FOR PRESENTING VIEWING CONTENT DURING TRAVEL," Ser. No. 11/154,749, filed on Jun. 15, 2005; and entitled "SYSTEM AND METHOD FOR RECEIVING BROADCAST CONTENT ON A MOBILE PLATFORM DURING INTERNATIONAL TRAVEL," Ser. No. 11/269,378, filed on Nov. 7, 2005, which are assigned to the assignee of the present application and the respective disclosures of which are hereby incorporated herein by reference in their entireties.

The content sources 310 can include one or more internal content sources, such as server system 310A, that are installed aboard the vehicle 390 and/or remote (or terrestrial) content sources 310B that can be external from the vehicle 390. The server system 310A can be provided as an information system controller for providing overall system control functions for the vehicle information system 300 and/or at least one media (or file) server system, as illustrated in FIGS. 2A-B), for storing preprogrammed content and/or downloaded viewing content 210D, as desired. The server system 310A can include, and/or communicate with, one or more conventional peripheral media storage systems (not shown), including optical media devices, such as a digital video disk (DVD) system or a compact disk (CD) system, and/or magnetic media systems, such as a video cassette recorder (VCR) system or a hard disk drive (HDD) system, of any suitable kind, for storing the preprogrammed content and/or the downloaded viewing content 210D.

Being configured to distribute and/or present the viewing content 210 provided by one or more selected content sources 310, the vehicle information system 300 can communicate with the content sources 310 in real time and in any conventional manner, including via wired and/or wireless communications. The vehicle information system 300 and the terrestrial content source 310B, for example, can communicate in any conventional wireless manner, including directly and/or indirectly via an intermediate communication system 370, such as a satellite communication system 370A. The vehicle information system 300 thereby can receive download viewing content 210D from a selected terrestrial content source 310B and/or transmit upload viewing content 210U, including navigation and other control instructions, to the terrestrial content source 310B. As desired, the terrestrial content source 310B can be configured to communicate with other terrestrial content sources (not shown). The terrestrial content source 310B is shown in FIG. 2B as providing access to the Internet 310C. Although shown and described as comprising the satellite communication system 370A for purposes of illustration, it is understood that the communication system 370 can comprise any conventional type of wireless communication system, such as a cellular communication system (not shown)

and/or an Aircraft Ground Information System (AGIS) communication system (not shown).

To facilitate communications with the terrestrial content sources 310B, the vehicle information system 300 can include an antenna system 330 and a transceiver system 340 for receiving the viewing content from the remote (or terrestrial) content sources 310B as shown in FIGS. 2A-B. The antenna system 330 preferably is disposed outside the vehicle 390, such as an exterior surface 394 of a fuselage 392 of the aircraft 390B. The antenna system 330 can receive viewing content 210 from the terrestrial content source 310B and provide the received viewing content 210, as processed by the transceiver system 340, to a computer system 350 of the vehicle information system 300. The computer system 350 can provide the received viewing content 210 to the media server system 310A and/or to one or more of the user interfaces 360, as desired. Although shown and described as being separate systems for purposes of illustration, the computer system 350 and the media server system 310A can be at least partially integrated.

Figure 3:
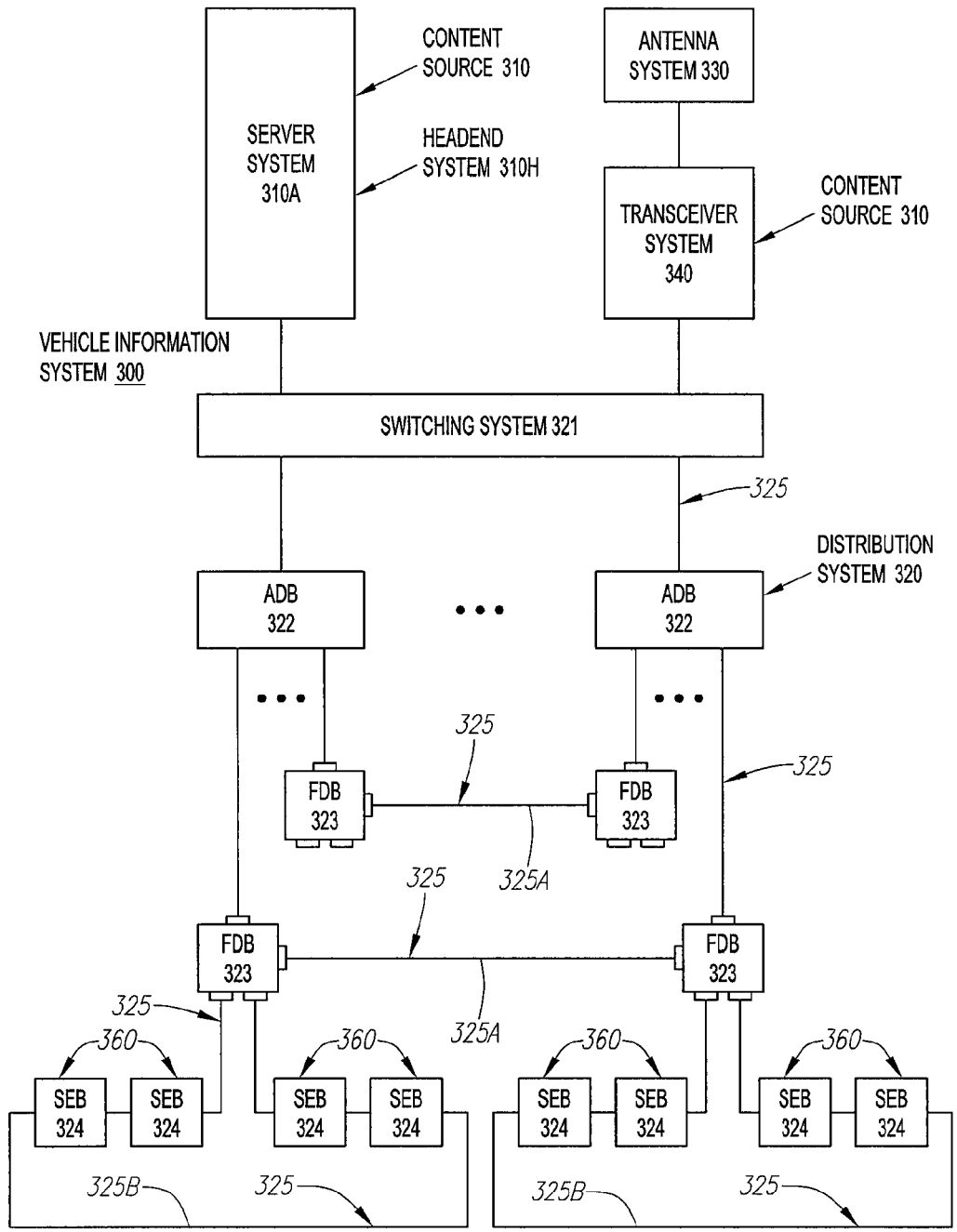
FIG. 3 is an exemplary detail drawing illustrating one preferred embodiment of a distribution system for the vehicle information systems of FIGS. 2A-B.

The vehicle information system elements, including the content sources 310 and the user interface systems 360, are shown in FIGS. 2A-B as communicating via the content distribution system 320. FIG. 3 illustrates an exemplary content distribution system 320 for the vehicle information system 300. The content distribution system 320 of FIG. 3 couples, and supports communication between a headend system 310H, which includes the content sources 310, and the plurality of user interface systems 360. The distribution system 320 as shown in FIG. 3 is provided in the manner set forth co-pending United States patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006, and in U.S. Pat. Nos. 5,596,647, 5,617,331, and 5,953,429, each entitled "INTEGRATED VIDEO AND AUDIO SIGNAL DISTRIBUTION SYSTEM AND METHOD FOR USE ON COMMERCIAL AIRCRAFT AND OTHER VEHICLES," which are assigned to the assignee of the present application and the respective disclosures of which are hereby incorporated herein by reference in their entireties.

As desired, the distribution system 320 likewise can include a network management system (not shown) provided in the manner set forth in co-pending United States patent applications, entitled "SYSTEM AND METHOD FOR IMPROVING NETWORK RELIABILITY," Ser. No. 10/773,523, filed on Feb. 6, 2004, and entitled "SYSTEM AND METHOD FOR IMPROVING NETWORK RELIABILITY," Ser. No. 11/086,510, filed on Mar. 21, 2005, which are assigned to the assignee of the present application and the respective disclosures of which are hereby incorporated herein by reference in their entireties.

As illustrated in FIG. 3, the distribution system 320 can be provided as a plurality of area distribution boxes (ADBs) 322, a plurality of floor disconnect boxes (FDBs) 323, and a plurality of seat electronics boxes (SEBs) (and/or premium seat electronics boxes (PSEBs)) 324 being configured to communicate in real time via a plurality of wired and/or wireless communication connections 325. The distribution system 320 likewise can include a switching system 321 for providing an interface between the distribution system 320 and the headend system 310H. The switching system 321 can comprise a conventional switching system, such as an Ethernet switching system, and is configured to couple the headend system 310H with the area distribution boxes 322. Each of the area distribution boxes 322 is coupled with, and communicates with, the switching system 321.

Each of the area distribution boxes 322, in turn, is coupled with, and communicates with, at least one floor disconnect box 323. Although the area distribution boxes 322 and the associated floor disconnect boxes 323 can be coupled in any conventional configuration, the associated floor disconnect boxes 323 preferably are disposed in a star network topology about a central area distribution box 322 as illustrated in FIG. 3. Each floor disconnect box 323 is coupled with, and services, a plurality of daisy-chains of seat electronics boxes 324. The seat electronics boxes 324, in turn, are configured to communicate with the user interface systems 360. Each seat electronics box 324 can support one or more of the user interface systems 360.

As desired, the floor disconnect boxes 323 advantageously can be provided as routing systems and/or interconnected in the manner set forth in the above-referenced co-pending U.S. patent application, entitled "SYSTEM AND METHOD FOR ROUTING COMMUNICATION SIGNALS VIA A DATA DISTRIBUTION NETWORK," Ser. No. 11/277,896, filed on Mar. 29, 2006. The distribution system 320 can include at least one FDB internal port bypass connection 325A and/or at least one SEB loopback connection 325B. Each FDB internal port bypass connection 325A is a communication connection 325 that permits floor disconnect boxes 323 associated with different area distribution boxes 322 to directly communicate. Each SEB loopback connection 325B is a communication connection 325 that directly couples the last seat electronics box 324 in each daisy-chain of seat electronics boxes 324 for a selected floor disconnect box 323 as shown in FIG. 3. Each SEB loopback connection 325B therefore forms a loopback path among the daisy-chained seat electronics boxes 324 coupled with the relevant floor disconnect box 323.

Returning to FIGS. 2A-B, the user interface systems 360 are provided for selecting viewing content 210 and for presenting the selected viewing content 210. As desired, the user interface systems 360 can comprise conventional passenger interfaces and can be provided in the manner set forth in the above-referenced co-pending United States patent application, entitled "PORTABLE MEDIA DEVICE AND METHOD FOR PRESENTING VIEWING CONTENT DURING TRAVEL," Ser. No. 11/154,749, filed on Jun. 15, 2005, as well as in the manner set forth in the co-pending United States patent application, entitled "SYSTEM AND METHOD FOR PRESENTING HIGH-QUALITY VIDEO TO PASSENGERS ON A MOBILE PLATFORM," Ser. No. 60/673,171, filed on Apr. 19, 2005, the disclosure of which is hereby incorporated herein by reference in its entirety.

Figure 4A:
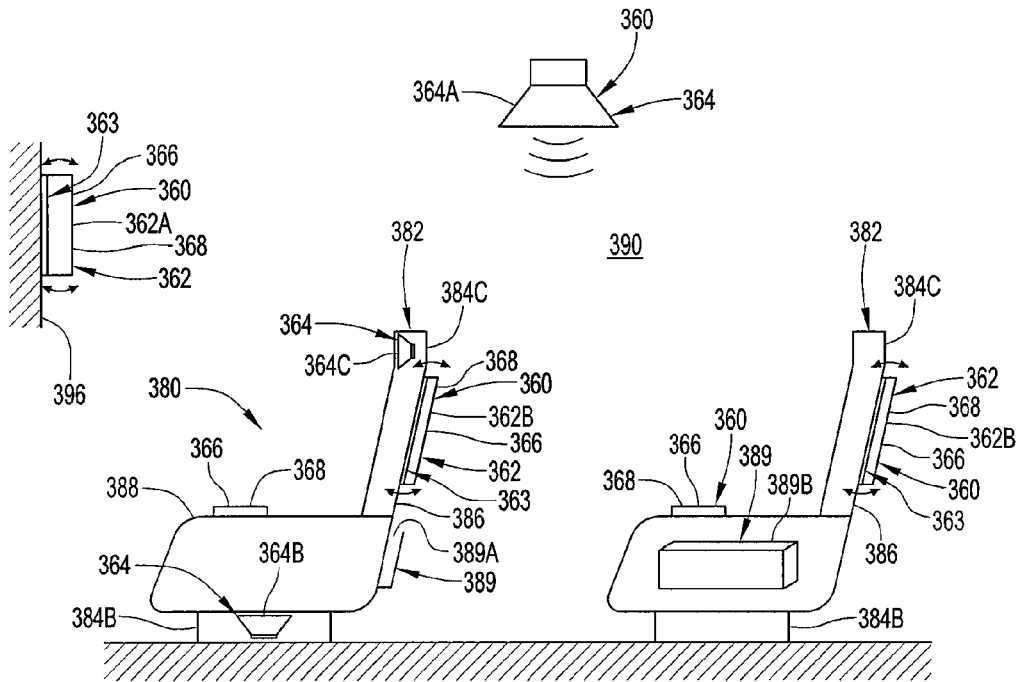
FIG. 4A is an exemplary top-level drawing illustrating a passenger cabin of a vehicle, wherein the vehicle information system of FIGS. 2A-B has been installed.

FIG. 4A provides a view of a passenger cabin 380 of a passenger vehicle 390, such as the automobile 390A (shown in FIG. 2A) and/or the aircraft 390B (shown in FIG. 2B), aboard which the vehicle information system 300 has been installed. The passenger cabin 380 is illustrated as including a plurality of passenger seats 382, and each passenger seat 382 is associated with a selected user interface system 360. Each user interface system 360 can include a video interface system 362 and/or an audio interface system 364. Exemplary video interface systems 362 can include overhead cabin display systems 362A with central controls, seatback display systems 362B or armrest display systems (not shown) each with individualized controls, crew display panels, and/or handheld presentation systems. The audio interface systems 364 can be provided in any conventional manner, including an overhead speaker system 364A, the handheld presentation systems, and/or headphones coupled with an audio jack provided, for example, at an armrest 388 of the passenger seat 382. A speaker system likewise can be associated with the passenger seat 382, such as a speaker system 364B disposed within a base 384B of the passenger seat 382 and/or a speaker system 364C disposed within a headrest 384C of the passenger seat 382. In a preferred embodiment, the audio interface system 364 can include an optional noise-cancellation system for further improving sound quality produced by the audio interface system 364.

The video interface systems 362 and the audio interface systems 364 can be installed at any suitable cabin surface, such as a seatback 386, wall 396, ceiling, and/or bulkhead, or an armrest 388 of a passenger seat 382 in any conventional manner including via a mounting system 363 provided in the manner set forth co-pending United States patent applications, entitled "SYSTEM AND METHOD FOR MOUNTING USER INTERFACE DEVICES," Ser. No. 11/828,193, filed on Jul. 25, 2007, and entitled "USER INTERFACE DEVICE AND METHOD FOR PRESENTING VIEWING CONTENT," Ser. No. 11/835,371, filed on Aug. 7, 2007, which are assigned to the assignee of the present application and the respective disclosures of which are hereby incorporated herein by reference in their entireties.

As shown in FIG. 4A, the user interface system 360 likewise can include an input system 366 for permitting the user (or passenger) 700 (shown in FIG. 6B) to communicate with the vehicle information system 300, such as via an exchange of control signals 220. For example, the input system 366 can permit the user 700 to enter one or more user instructions 230 for controlling the operation of the vehicle information system 300. Illustrative user instructions 230 can include instructions for initiating communication with the content source 310, instructions for selecting viewing content 210 for presentation, and/or instructions for controlling the presentation of the selected viewing content 210. If a fee is required for accessing the viewing content 210, payment information likewise can be entered via the input system 366.

The input system 366 can be provided in any conventional manner and typically includes one or more switches (or pushbuttons), such as a keyboard or a keypad, and/or a pointing device, such as a mouse, trackball, or stylus. As desired, the input system 366 can be at least partially integrated with, and/or separable from, the associated video interface system 362 and/or audio interface system 364. For example, the video interface system 362 and the input system 366 can be provided as a touchscreen display system. The input system 366 likewise can include one or more input ports (not shown) for coupling a peripheral input device (not shown), such as a full-size computer keyboard, an external mouse, and/or a game pad, with the vehicle information system 300.

Preferably, at least one of the user interface systems 360 includes a wired and/or wireless access point 368, such as a conventional communication port (or connector), for coupling a personal media device 200 (shown in FIG. 4B) with the vehicle information system 300. Passengers (not shown) who are traveling aboard the vehicle 390 thereby can enjoy personally-selected viewing content during travel. The access point 368 is located proximally to an associated passenger seat 382 and can be provided at any suitable cabin surface, such as a seatback 386, wall 396, ceiling, and/or bulkhead.

Figure 4B:
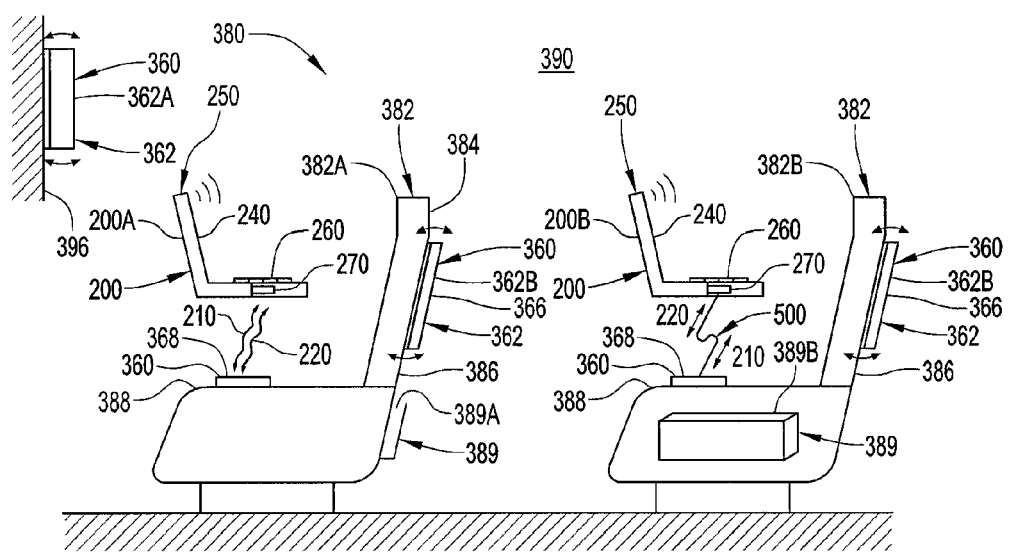
FIG. 4B is an exemplary top-level drawing illustrating an embodiment of the vehicle information system of FIG. 4A, wherein the vehicle information system is in communication with the personal media device of FIG. 1.

Turning to FIG. 4B, the personal media devices 200 and the vehicle information system 300 are shown as communicating via respective access points 368. Being provided in the manner set forth above with reference to FIG. 1, the illustrated personal media devices 200 each include a video display system 240 for visually presenting the viewing content 210 and an audio system 250 for audibly presenting the viewing content 210. Each personal media device 200 can include a user control system 260, which can be provided in any conventional manner and typically includes one or more switches (or pushbuttons), such as a keyboard or a keypad, and/or a pointing device, such as a mouse, trackball, or stylus. The personal media devices 200 thereby can select desired viewing content 210 and control the manner in which the selected viewing content 210 is received and/or presented.

The personal media devices 200 likewise include a communication port (or connector) 270. The communication port 270 enables the personal media devices 200 to communicate with the vehicle information system 300 via the access points 368 of the user interface systems 360. As illustrated with personal media device 200A, the communication port 270 and the access points 368 can supported wireless communications; whereas, support for wired communications between the communication port 270 and the access points 368 via a communication cable assembly 500 is shown with personal media device 200B. When the communication port 270 and the access points 368 are in communication, the vehicle information system 300 supports a simple manner for permitting the associated personal media device 200 to be integrated with the vehicle information system 300 using a user-friendly communication interface.

When the personal media device 200 and the vehicle information system 300 are in communication, the vehicle information system 300 can perform a plurality of integration tasks simultaneously, enabling the personal media device 200 to become fully integrated with the vehicle information system 300 via a selected access point 368. The system elements of the vehicle information system 300 and the personal media device 200 thereby become interchangeable. The personal media device 200 likewise can receive control signals (or commands) 220 and/or operating power 220P from the vehicle information system 300. Thereby, the personal media device 200 advantageously can become a seamless part of the vehicle information system 300.

For example, user instructions 230 (shown in FIGS. 2A-B) for controlling the operation of the vehicle information system 300 can be provided via the input system 366 of the vehicle information system 300 and/or the user control system 260 of the personal media device 200. In other words, the input system 366 of the vehicle information system 300 and/or the user control system 260 of the personal media device 200 can be used to select viewing content 210 and control the manner in which the selected viewing content 210 is received and/or presented. The selected viewing content 210 can be provided by a relevant content source 310 (shown in FIGS. 2A-B) of the vehicle information system 300 and/or by storage media (not shown) disposed within the personal media device 200. A video portion of the selected viewing content 210 thereby can be presented via the video presentation system 362 of the vehicle information system 300 and/or the video display system 240 of the personal media device 200. The audio presentation system 364 of the vehicle information system 300 and/or the audio system 250 of the personal media device 200 can be used to present an audio portion of the selected viewing content 210. If the video display system 240 of the personal media device 200 is much smaller than the video presentation system 362 of the vehicle information system 300, a passenger may prefer to view the selected viewing content 210 via the larger video presentation system 362.

When no longer in use and/or direct physical contact with the personal media device 200 is not otherwise required, the personal media device 200 can be stored at the passenger seat 382. For example, the passenger seat 382 can include a storage compartment 389 for providing storage of the personal media device 200. The storage compartment 389 can be provided in any conventional manner and at any suitable portion of the passenger seat 382. As illustrated with passenger seat 382B, the personal media device 200 can be placed in a storage pocket 389B formed in the armrest 388 of the passenger seat 382B. The storage compartment 389 likewise can be provided on the seatback 386 and/or the headrest 384 of the passenger seat 382. Storage compartment 389A of passenger seat 382A, for example, is shown as being formed on the lower seatback 386 of the passenger seat 382A. As desired, the storage compartment 389 can comprise an overhead storage compartment, a door storage compartment, a storage compartment provided underneath the passenger seat 382, or any other type of conventional storage compartment, such as a glove compartment, trunk, or closet, available in the passenger vehicle 390.

As set forth in more detail above, the vehicle information system 300 can communicate with the personal media device 200 in any conventional wired and/or wireless manner. If the personal media device 200 comprises an iPod® digital electronic media device 200', for example, the vehicle information system 300 and the iPod® digital electronic media device 200' can communicate in the manner illustrated in FIG. 5. Exemplary manners for establishing communication between the vehicle information system 300 and the iPod® digital electronic media device 200' are shown and described in the above-referenced "SYSTEM AND METHOD FOR INTERFACING A PORTABLE MEDIA DEVICE WITH A PASSENGER INFORMATION SYSTEM," Ser. No. 12/210,624, filed Sep. 15, 2008.

Figure 5:
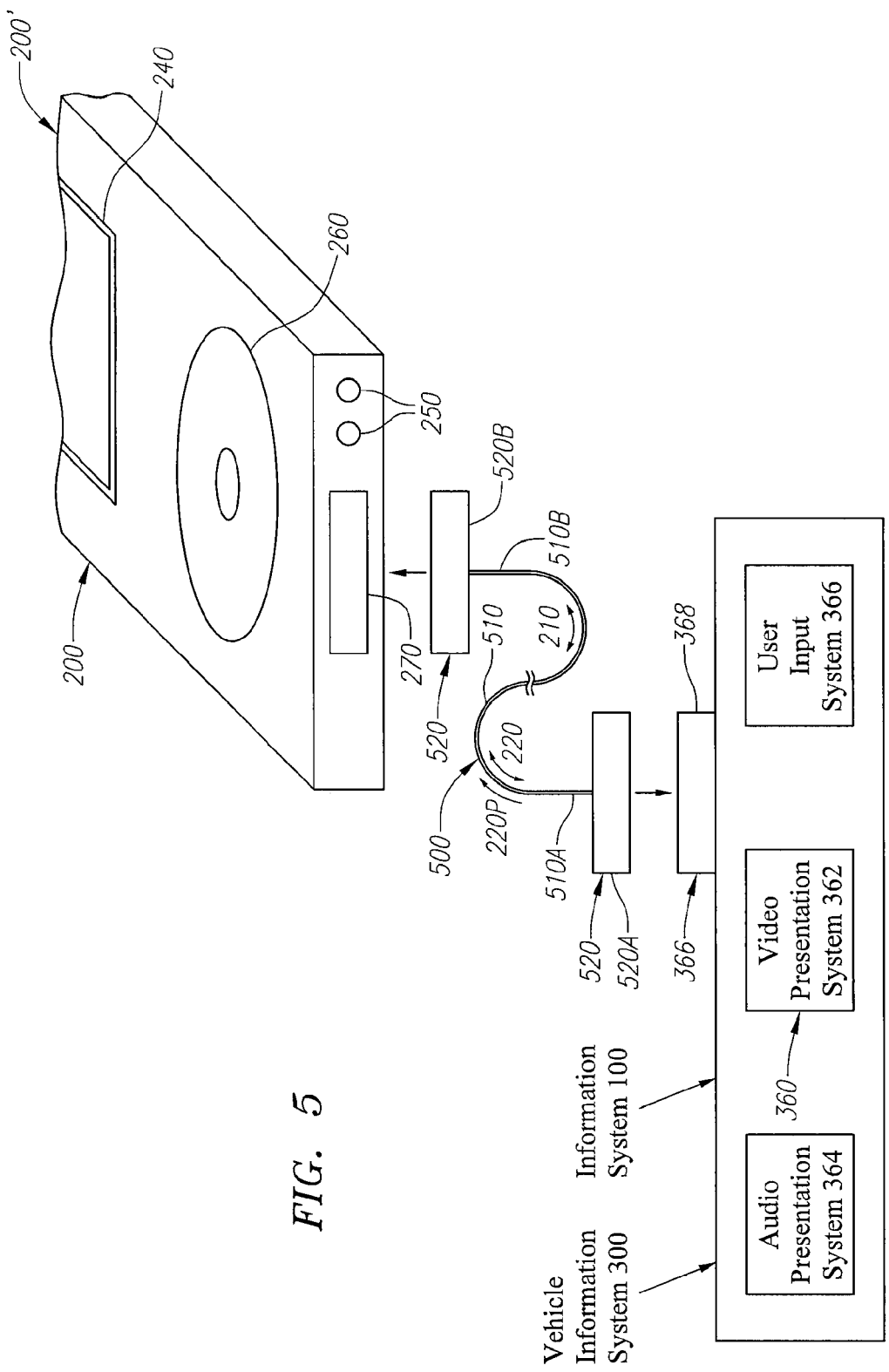
FIG. 5 is an exemplary top-level drawing illustrating an embodiment of the vehicle information system of FIGS. 2A-B, wherein the vehicle information system is in communication with an iPod® digital electronic media device.

FIG. 5 illustrates an exemplary communication cable assembly 500 for supporting wired communications between the vehicle information system 300 and the iPod® digital electronic media device 200'. The communication cable assembly 500 can comprise a conventional communication assembly, having a communication cable 510 with a suitable cable length and being terminated with two or more communication connectors (or ports) 520. As shown in FIG. 5, the communication cable 510 is terminated with a system communication connector (or port) 520A for removably coupling with the vehicle information system 300 and a device communication connector (or port) 520B for removably coupling with the iPod® digital electronic media device 200'. The system communication connector 520A and the device communication connector 520B each can comprise any conventional type of connector system. Although shown and described as being provided on respective opposite end regions 510A, 510B of the communication cable assembly 500 for purposes of illustration only, the system and device communication connectors 520A, 520B can be provided the communication cable assembly 500 in any conventional manner.

In the manner set forth above, the communication cable assembly 500 can be utilized to transmit a variety of diverse signal types, such as audio signals, video signals, data signals, control signals, and power signals. The communication cable 510 preferably is provided in a manner to minimize interference (or crosstalk) among these diverse signals. The access point 368 of the vehicle information system 300 can be provided as a communication connector (or port) that is configured to cooperate with the system communication connector 520A. The access point 368 thereby can receive, and couple with, the system communication connector 520A. As desired, the system communication connector 520A likewise can be removed (or disconnected) from the access point 368.

If the personal media device 200 comprises an iPod® digital electronic media device 200' as shown in FIG. 5, the device communication connector 520B of the communication cable assembly 500 can comprise a thirty-pin connector suitable for being received by, and removably coupling with, the communication connector 270 of the iPod® digital electronic media device 200'. In other words, the device communication connector 520B of the communication cable assembly 500 can cooperate with the communication connector 270 of the iPod® digital electronic media device 200'. The iPod® digital electronic media device 200' is shown as including a video display system 240, an audio system 250, and a user control system 260 each being provided in the manner set forth in more detail above with reference to FIG. 4B. As shown in FIG. 5, the audio system 250 of the iPod® digital electronic media device 200' includes at least one audio jack for receiving a headset (not shown). The iPod® digital electronic media device 200' thereby can exchange control signals (or commands) 220 for selecting desired viewing content 210 and/or controlling the manner in which the selected viewing content 210 is received and/or presented. The iPod® digital electronic media device 200' likewise is shown as receiving the operating power 220P from, the vehicle information system 300.

When the iPod® digital electronic media device 200' and the vehicle information system 300 are coupled via the communication cable assembly 500, the viewing content 210, including any onboard service and local viewing content, can be selected by the user control system 260 of the iPod® digital electronic media device 200' for presentation on the video display system 240 and/or the audio system 250 of the iPod® digital electronic media device 200'. The user control system 260 of the iPod® digital electronic media device 200' likewise can select viewing content 210 provided by the iPod® digital electronic media device 200' for presentation. Since the video display system 240 of the iPod® digital electronic media device 200' typically is much smaller than the video presentation system 362 of the vehicle information system 300, a user (or passenger) 700 (shown in FIG. 6B) may prefer to view the selected viewing content 210 via the larger video presentation system 362. If the audio presentation system 364 of the vehicle information system 300 includes a sound enhancement system (not shown), such as an optional noise-cancellation system, for further improving sound quality produced by the audio interface system 364, the passenger 700 can elect to listen to the selected viewing content 210 via the audio presentation system 364 rather than via the audio system 250 of the iPod® digital electronic media device 200'.

Alternatively, and/or additionally, the input system 366 of the vehicle information system 300 can enable selection of the viewing content 210 from the vehicle information system 300 and/or the iPod® digital electronic media device 200' for presentation. The input system 366 likewise can control the presentation of the selected viewing content 210 in the manner discussed above. In other words, the input system 366 can provide control signals (or commands) 220, such as user control signals (or user control instructions) 230, to the vehicle information system 300 and/or the iPod® digital electronic media device 200'. When in communication with the vehicle information system 300 and controlled by the input system 366, the iPod® digital electronic media device 200' may be conveniently stored in the storage compartment 389 (shown in FIGS. 4A-B) provided at the passenger seat 382 (shown in FIGS. 4A-B) while the vehicle information system 300 continues to communicate with the iPod® digital electronic media device 200' via the access point 368. Advantageously, the viewing content 210 provided by the iPod® digital electronic media device 200' can be viewed via the video presentation system 362 and/or the audio presentation system 364 of the vehicle information system 300 while the iPod® digital electronic media device 200' is safely stowed in the storage compartment 389.

Turning to FIGS. 6A-F, the video presentation system 362, the audio presentation system 364, and/or the input system 366 of the vehicle information system 300 can be provided as an integrated audio/video presentation system 600. In other words, the video presentation system 362 can include a viewing screen 610 disposed on the integrated audio/video presentation system 600, and one or more audio ports (or connectors or jacks) 620 (or internal speaker systems) are provided on the integrated audio/video presentation system 600 as the audio presentation system 364. Thereby, when the vehicle information system 300 is in communication with the iPod® digital electronic media device 200' (shown in FIG. 5), selected viewing content 210 (shown in FIGS. 2A-B) provided by the iPod® digital electronic media device 200' can be presented via the viewing screen 610 and/or the audio jacks 620 of the integrated audio/video presentation system 600. As desired, the integrated audio/video presentation system 600 likewise can include one or more other types of ports (or connectors or jacks) (not shown) for communicating with a peripheral video presentation system and/or a handheld user control system.

The integrated audio/video presentation system 600 preferably provides enhanced viewing content presentation capabilities. For example, the viewing screen 610 can be provided as a high-resolution viewing screen 610 with a screen size that is larger than a screen size of the video display system 240 (shown in FIG. 5) of the iPod® digital electronic media device 200' (shown in FIG. 5). Alternatively, and/or additionally, the audio presentation system 364 of the integrated audio/video presentation system 600 can include a conventional noise-cancellation system (not shown) for further improving sound quality of the viewing content 210.

The integrated audio/video presentation system 600 likewise can be associated with the input system 366 for selecting the viewing content 210 available from the iPod® digital electronic media device 200' and/or controlling the manner by which the selected viewing content 210 is presented by the integrated audio/video presentation system 600. As desired, the video presentation system 362, the audio presentation system 364, and/or the input system 366 of the integrated audio/video presentation system 600 can be at least partially integrated. The video presentation system 362 and the input system 366 of the integrated audio/video presentation system 600, for example, can include a touchscreen display system. Although a conventional touchscreen display system can be incorporated into the integrated audio/video presentation system 600, conventional touchscreen display systems can prove difficult to configure for use with the vehicle information system 300 and can have reliability issues.

The touchscreen display system, for example, can employ capacitive touchscreen technology. Exemplary capacitive touchscreen display systems are manufactured by Trident Ltd. of Surrey, United Kingdom, Elo TouchSystems Inc., of Menlo Park, Calif., and TouchKO Inc., of Cedar Park, Tex. If the color mask of the touchscreen display system is disposed between the touchscreen panel and the display, a surface capacitive touchscreen display system may be employed. Although shown and described as comprising capacitive touchscreen technology for purposes of illustration only, the touchscreen display system can be provided using other touchscreen technologies, such as resistive touchscreen technology and/or infrared (IR) touchscreen technology.

As desired, the viewing screen 610 and the audio jacks 620 (or internal speaker systems) of the integrated audio/video presentation system 600 can be mounted in a coplanar arrangement. In other words, the audio jacks 620 (or internal speaker systems) can be mounted flush with the viewing screen 610 on the integrated audio/video presentation system 600. At least one opening (not shown) can be formed in the viewing screen 610 of the integrated audio/video presentation system 600 for receiving the audio jacks 620 (or internal speaker systems). The audio jacks 620 (or internal speaker systems) thereby can be received by and/or disposed within the opening. Application of surface acoustical wave (SAW) technology can further ensure that the viewing screen 610 operates properly after the opening is formed. A capacitive touchscreen display system advantageously can be provided with sufficient power to work through the opening and/or a film overlay (not shown). The film overlay can be disposed on the capacitive touchscreen display system in any convention manner, including behind, or in front of, the touchscreen panel.

Figure 6A:
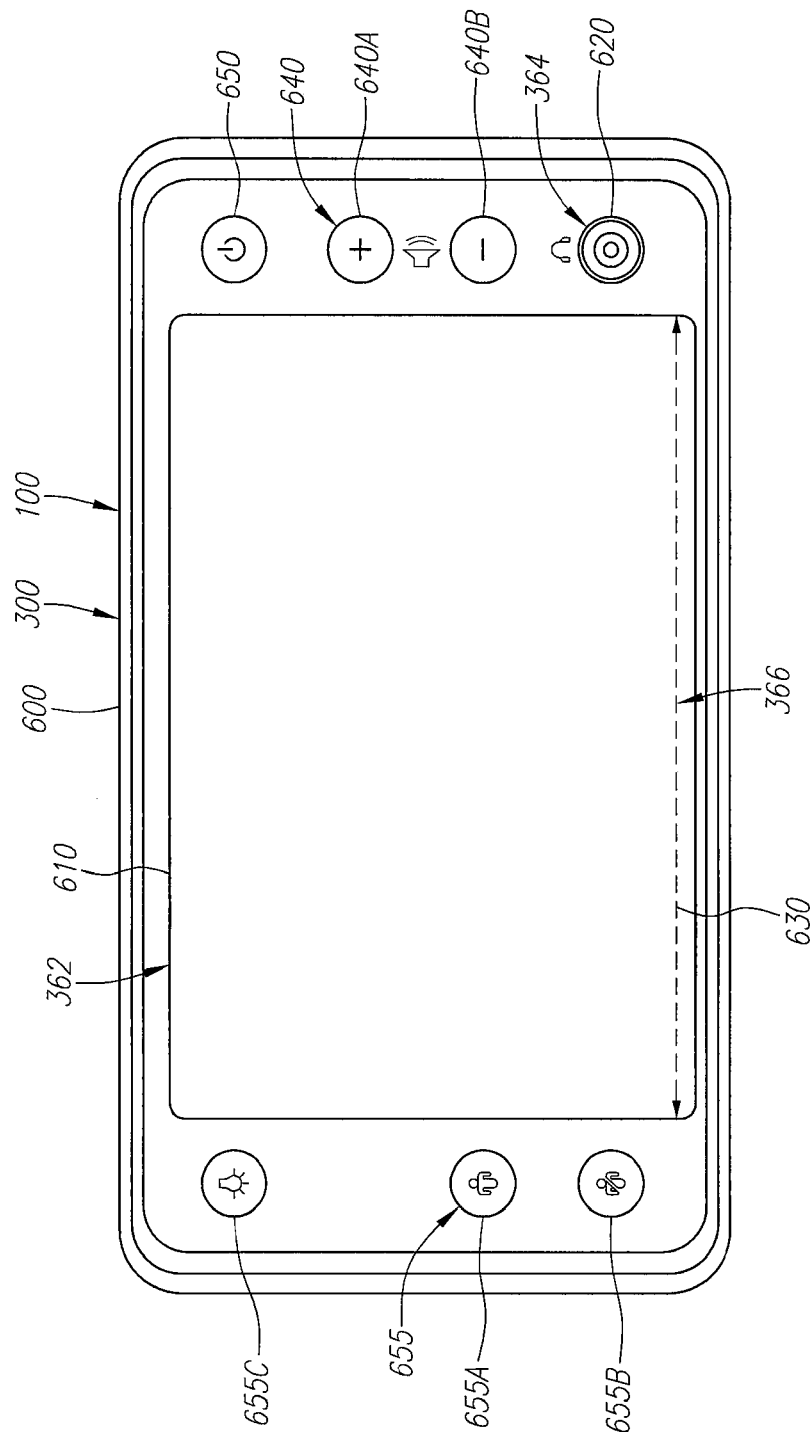
FIG. 6A is an exemplary detail drawing illustrating an embodiment of an integrated audio/video presentation system for the vehicle information system of FIG. 5.

FIG. 6A shows that the input system 366 of the integrated audio/video presentation system 600 can include one or more user controls that are provided in any suitable arrangement. For instance, the input system 366 can include a video control system 630 for controlling the playback of the viewing content 210 (shown in FIGS. 2A-B), such as via a conventional scroll bar 210S (shown in FIG. 6F). An exemplary audio control system 640 of the input system 366 is shown as being a volume control system with a first button 640A for increasing the volume of an audio portion of the viewing content 210 and/or a second button 640B for decreasing the volume of the audio portion. As desired, the input system 366 of the integrated audio/video presentation system 600 can include at least one other user controls. The integrated audio/video presentation system 600 of FIG. 6A is shown as having a power control system 650, such as an on/off button. If installed aboard a passenger vehicle, the integrated audio/video presentation system 600 likewise can include an onboard services control system 655 for controlling one or more onboard passenger services. The onboard services control system 655 is illustrated in FIG. 6A as including a flight attendant call button 655A, a cancel flight attendant call button 655B, and/or a seat lighting system control button 655C.

Viewing content 210 (shown in FIGS. 2A-B) available on the vehicle information system 300 as well as viewing content 210 available from any connected personal media devices 200 and/or iPod® digital electronic media devices 200' (shown in FIG. 5) can be selected for presentation in any conventional manner. Since the personal media devices 200, such as iPod® digital electronic media devices 200', typically include personally-provided viewing content, the viewing content 210 provided by a selected personal media device 200 preferably is only available at the associated passenger seat 382 (shown in FIGS. 4A-B) within a vehicle 390 (shown in FIGS. 2A-B) to protect the privacy of the passenger (or user) 700 (shown in FIG. 7B). The viewing content 210 provided by the selected personal media device 200, however, can be made available at other passenger seats 382 within the vehicle 390, as desired. For example, if two or more passengers 700 are traveling in a group, the passengers in the group may wish to share the viewing content 210 from their personal media devices 200 with each other via the vehicle information system 300. Accordingly, a passenger 700 can elect to make the viewing content 210 on his personal media device 200 available to one or more selected passengers 700 (or selected passenger seats 382) via the vehicle information system 300 during travel.

The integrated audio/video presentation system 600, for example, can present a menu system for selecting viewing content 210 (shown in FIGS. 2A-B) available on the vehicle information system 300 for presentation. In one embodiment, the menu system can comprise a hierarchical (or sequential) menu system. Turning to FIG. 6, the integrated audio/video presentation system 600 can present a content menu system 660 that includes a listing of a plurality of content indicia 665 associated with various types of viewing content 210 and/or types of content sources 310 (shown in FIGS. 2A-B) associated with the vehicle information system 300. Exemplary types of content indicia 665 can include shopping content indicia 665A, at least one iPod® digital electronic media device content indicia 665B, and/or television/film content indicia 665C.

As shown in FIG. 6B, the content indicia 665 can identify the available viewing content 210 in any conventional manner, including use of text, such as words or abbreviations, and/or at least one symbol that identify the available viewing content 210. The textual description can be provided in one or more relevant languages and preferably is changeable such that a suitable language is presented based upon the geographical location of the vehicle information system 300. The user 700 can navigate the content menu system 660 via the input system 366 (shown in FIG. 6A), such as the touchscreen display system, of the integrated audio/video presentation system 600 and thereby can select a relevant type of viewing content 210 and/or content source 310 by selecting (or activating) the associated content indicia 665 via the input system 366 (shown in FIG. 6A) of the integrated audio/video presentation system 600.

Figure 6C:
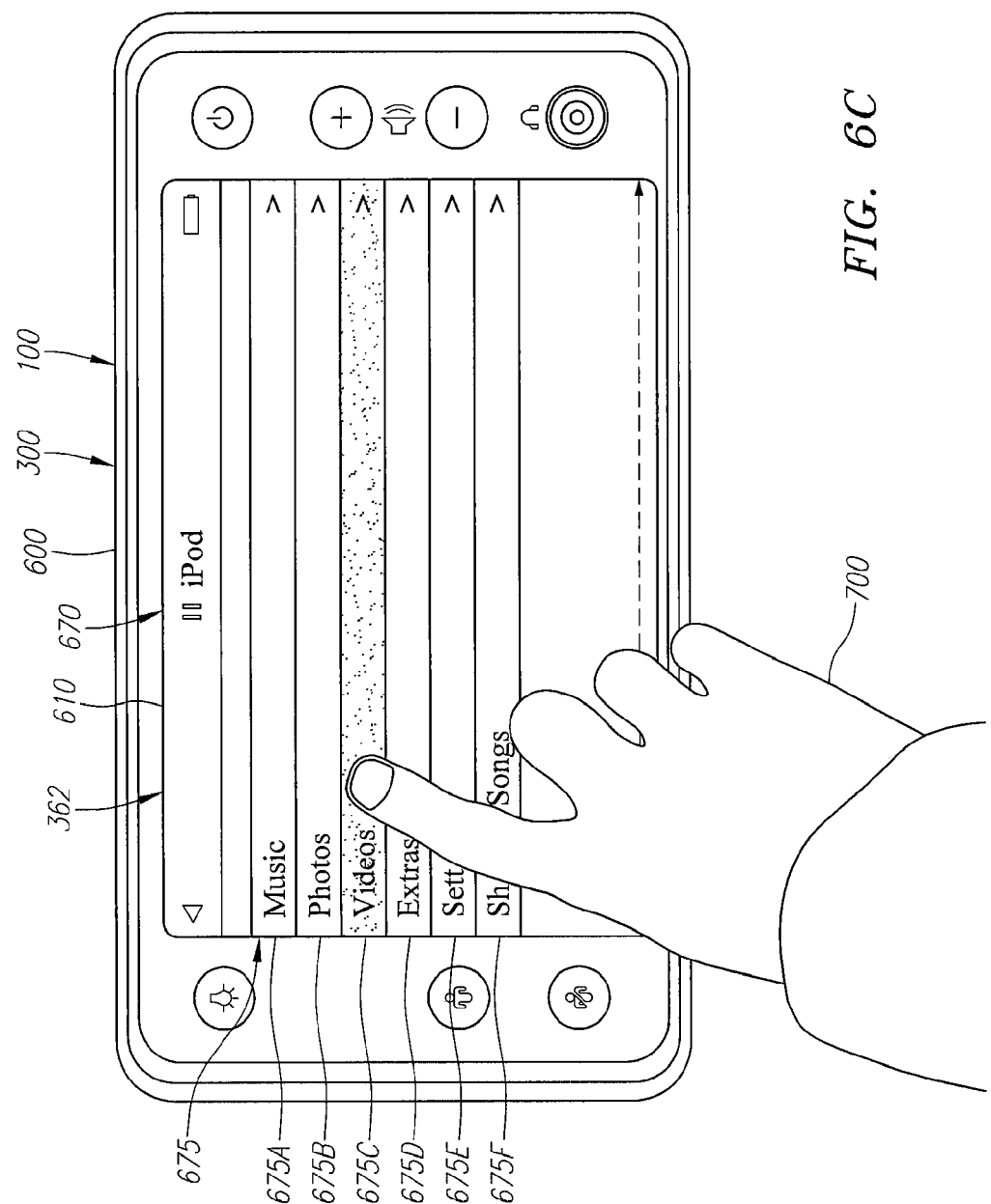
FIG. 6C is an exemplary detail drawing illustrating an embodiment of the integrated audio/video presentation system of FIG. 6B, wherein the integrated audio/video presentation system, upon selection of the viewing content provided by the iPod® digital electronic media device, presents a menu structure of available viewing content from the iPod® digital electronic media device.

If the iPod® digital electronic media device content indicia 665B (shown in FIG. 6B) is activated, the integrated audio/video presentation system 600 can present an iPod® content menu system 670 as illustrated in FIG. 6C. The iPod® content menu system 670 is shown as including a listing of a plurality of iPod® content indicia 675 associated with various types of viewing content 210 (shown in FIGS. 2A-B) available from the relevant iPod® digital electronic media device 200' (shown in FIG. 5), which is in communication with the vehicle information system 300. Exemplary types of iPod® content indicia 675 can include iPod® music content indicia 675A, iPod® photographic content indicia 675B, iPod® video content indicia 675C, and/or iPod® extras content indicia 675D.

Preferably, the vehicle information system 300 downloads a viewing content menu structure from the iPod® digital electronic media device 200', and the integrated audio/video presentation system 600 generates the iPod® content menu system 670 based upon the iPod® viewing content menu structure. The iPod® content menu system 670 thereby can include additional iPod® content indicia 675 for other iPod® digital electronic media device options, such as iPod® settings indicia 675E and/or iPod® shuffle songs indicia 675F. The user 700 can navigate the iPod® content menu system 670 via the input system 366 of the integrated audio/video presentation system 600 and thereby can select a relevant type of iPod® viewing content 210 by selecting (or activating) the associated iPod® content indicia 675 via the input system 366 (shown in FIG. 6A) of the integrated audio/video presentation system 600.

Figure 6D:
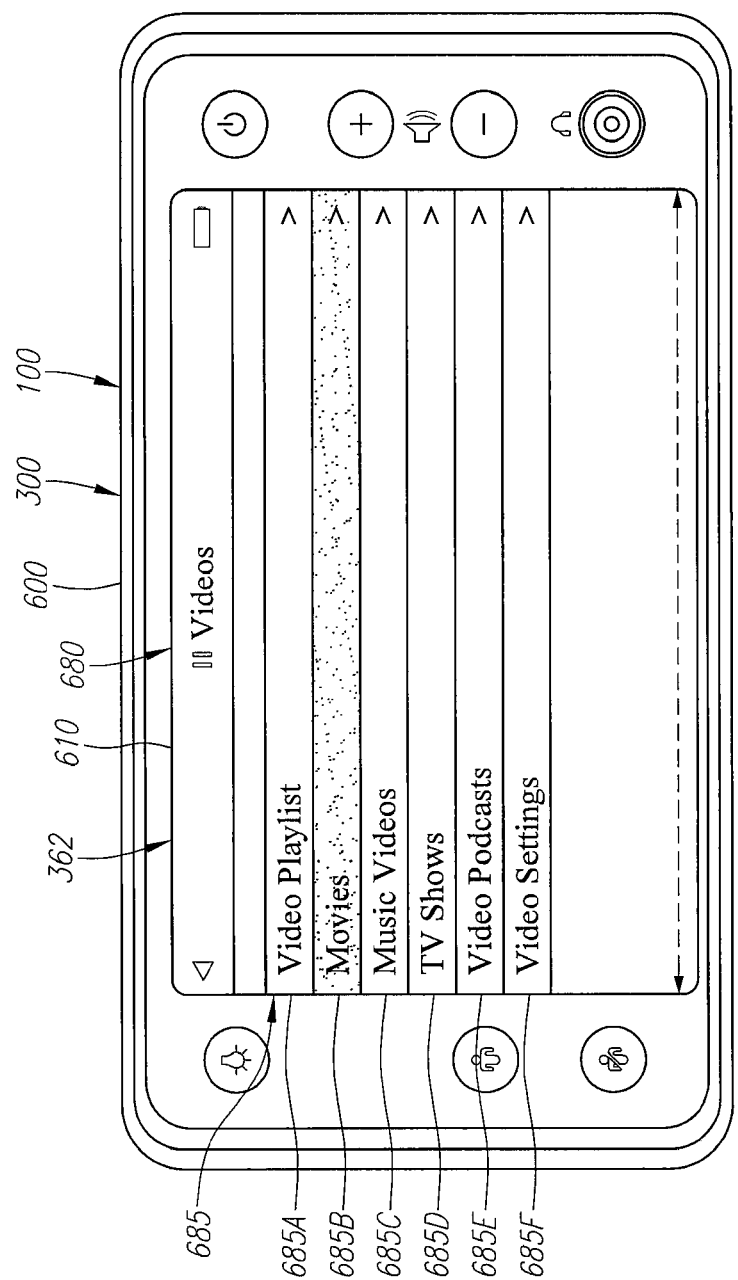
FIGS. 6D-E is an exemplary detail drawing illustrating an embodiment of the integrated audio/video presentation system of FIG. 6C, wherein the menu structure of the available viewing content comprises a hierarchical menu structure.

FIG. 6D shows an iPod® video content menu system 680 as presented by the integrated audio/video presentation system 600 once the iPod® video content indicia 675C (shown in FIG. 6C) is activated. The iPod® video content menu system 680 can include a listing of a plurality of iPod® video content indicia 685 associated with various types of video viewing content 210 (shown in FIGS. 2A-B) available from the relevant iPod® digital electronic media device 200' (shown in FIG. 5). As illustrated in FIG. 6D, the iPod® video content indicia 685 of the iPod® video content menu system 680 can include iPod® movie content indicia 685B, iPod® music video content indicia 685C, iPod® television programming content indicia 685D, and/or iPod® video podcast content indicia 685E.

Since the vehicle information system 300 preferably downloads the viewing content menu structure from the iPod® digital electronic media device 200', the integrated audio/video presentation system 600 can generate the iPod® video content menu system 680 based upon the iPod® viewing content menu structure. Thereby, the iPod® video content menu system 680 can include additional iPod® video content indicia 685 for other iPod® digital electronic media device options, such as iPod® video playlist indicia 675F and/or iPod® video settings indicia 685F. In the manner set forth above, the iPod® video content menu system 680 can be navigated via the input system 366 of the integrated audio/video presentation system 600, and a relevant type of video viewing content 210 can be selected by selecting (or activating) the associated iPod® video content indicia 685 via the input system 366 (shown in FIG. 6A) of the integrated audio/video presentation system 600.

Figure 6E:
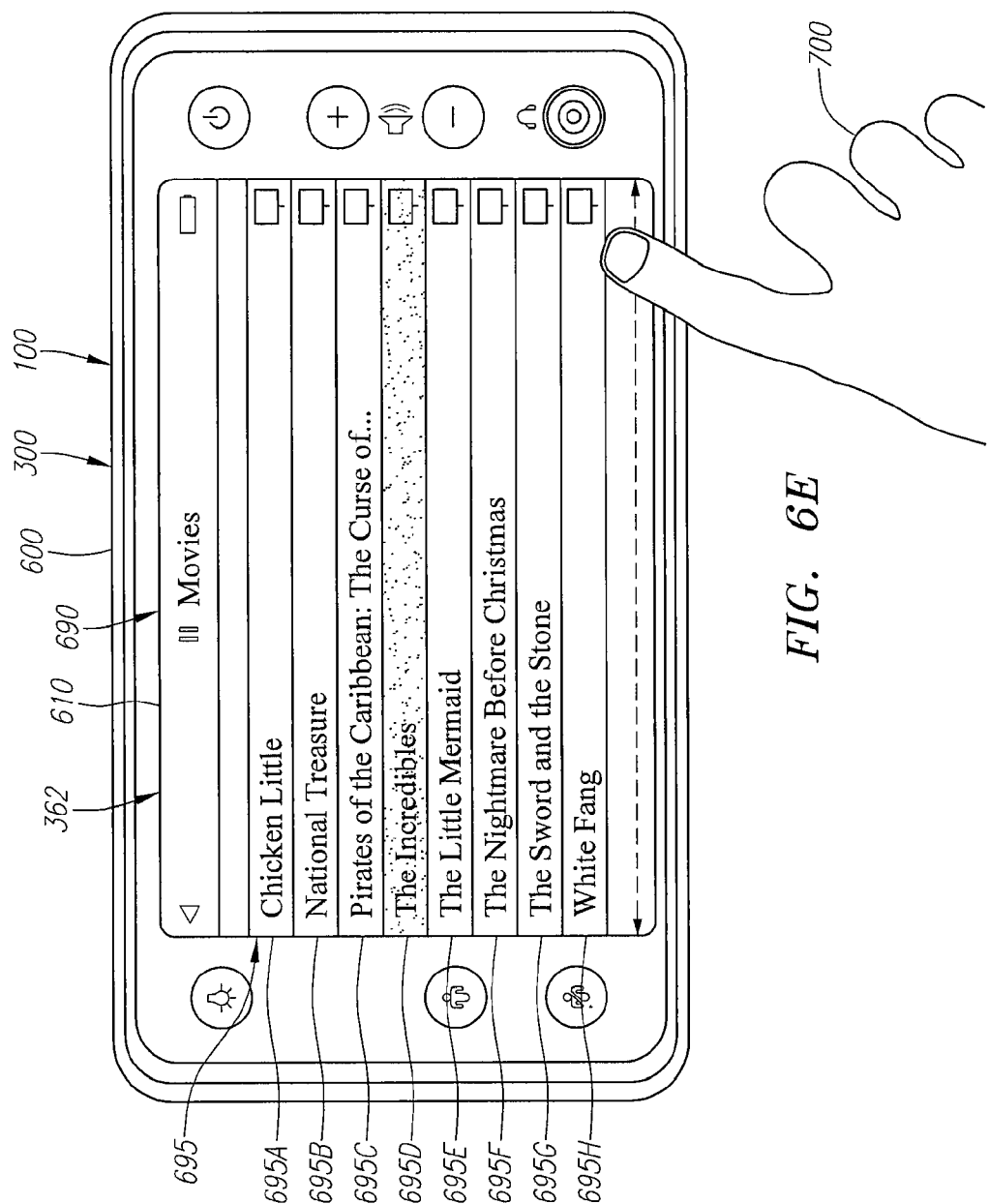

Turning to FIG. 6E, the integrated audio/video presentation system 600 is shown as presenting an iPod® movie content menu system 690. The integrated audio/video presentation system 600 preferably presents the iPod® movie content menu system 690 if the iPod® movie content indicia 685B (shown in FIG. 6D) is selected (or activated) via the input system 366 (shown in FIG. 6A) of the integrated audio/video presentation system 600. The iPod® movie content menu system 690 can include a listing of a plurality of iPod® movie content indicia 695 associated with various types (or titles) of movie viewing content 210 (shown in FIGS. 2A-B) available from the relevant iPod® digital electronic media device 200' (shown in FIG. 5). As illustrated in FIG. 6E, the movie content indicia 695 of the iPod® movie content menu system 690 can include movie content indicia 695A-H associated with selected titles of movie viewing content 210 available from the relevant iPod® digital electronic media device 200'.

Figure 6F:
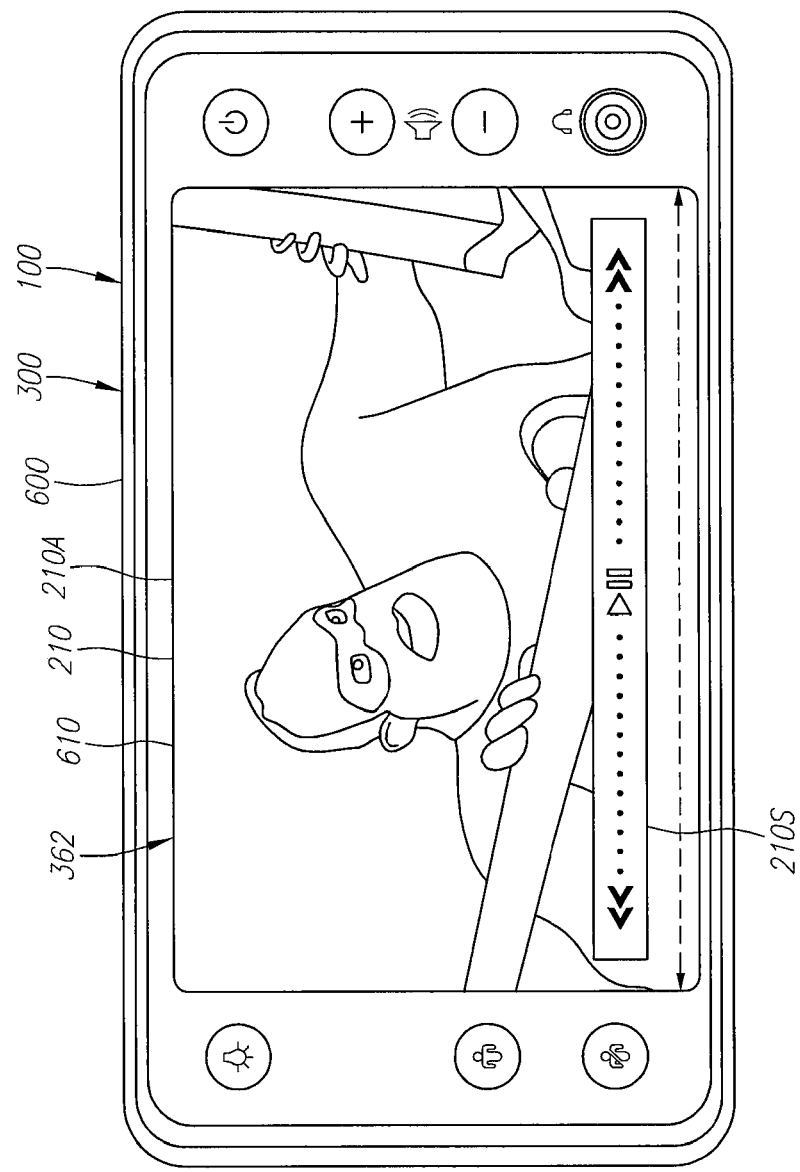
FIG. 6F is an exemplary detail drawing illustrating an embodiment of the integrated audio/video presentation system of FIGS. 6B-E, wherein the integrated audio/video presentation system presents the selected viewing content from the iPod® digital electronic media device.

In the manner set forth above, the vehicle information system 300 can download the viewing content menu structure from the iPod® digital electronic media device 200', and the integrated audio/video presentation system 600 can generate the iPod® movie content menu system 690 based upon the iPod® viewing content menu structure. As the iPod® movie content menu system 690 is navigated via the input system 366 of the integrated audio/video presentation system 600, relevant title of the movie viewing content 210 can be selected by activating the associated iPod® movie content indicia 695 as discussed above. If the iPod® movie content indicia 695D is selected, for example, the movie viewing content 210A associated with the iPod® movie content indicia 695D can be retrieved from the iPod® digital electronic media devices 200' (shown in FIG. 5) and can be presented via the integrated audio/video presentation system 600 as illustrated in FIG. 6F. Advantageously, the movie viewing content 210A provided by the iPod® digital electronic media device 200' can be selected and/or presented via integrated audio/video presentation system 600 of the vehicle information system 300 while the iPod® digital electronic media device 200' is safely stowed within the storage compartment 389 (shown in FIGS. 4A-B) of a relevant passenger seat 382 (shown in FIGS. 4A-B).

Figure 7A:
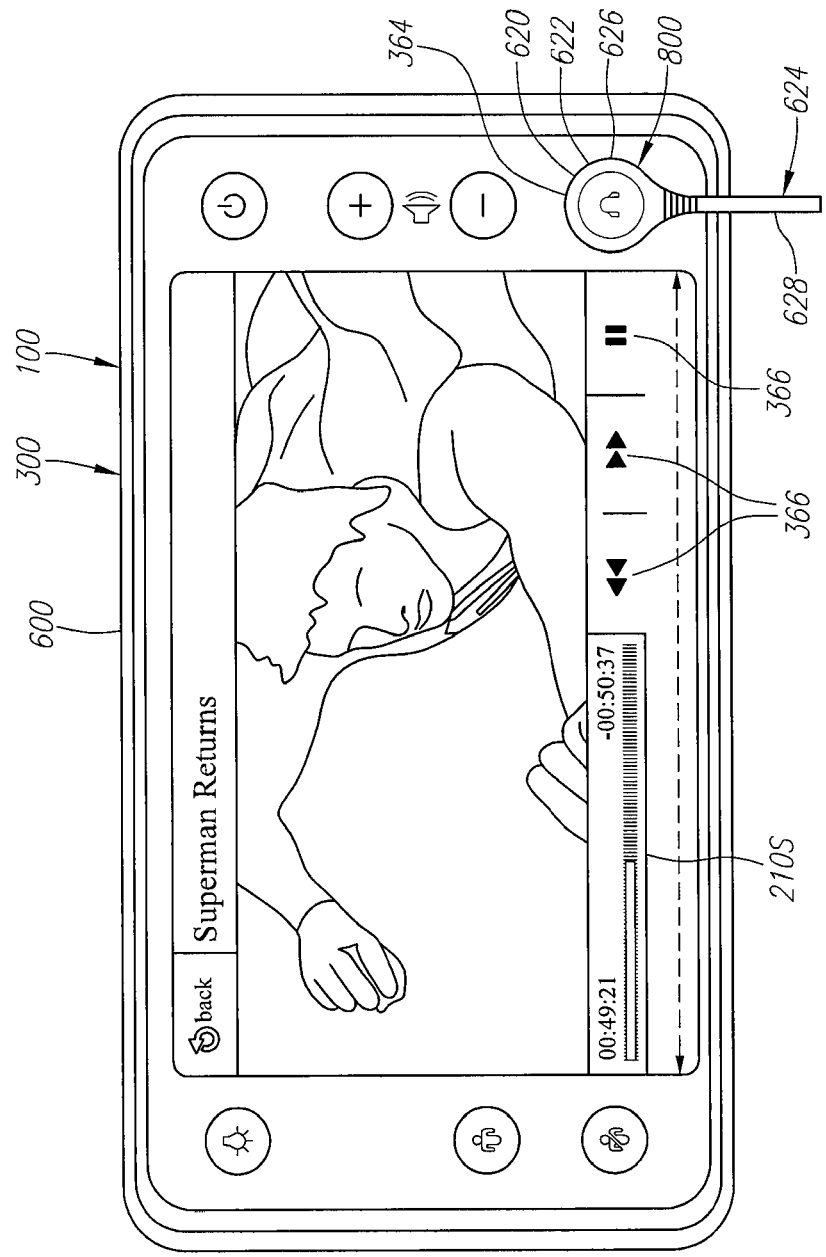
FIG. 7A is an exemplary detail drawing illustrating an embodiment of the integrated audio/video presentation system of FIGS. 6A-F, wherein the integrated audio/video presentation system includes a break-away communication connector system for coupling a peripheral presentation system with the integrated audio/video presentation system.

As shown in FIG. 7A, the audio ports (or connectors) 620 of the integrated audio/video presentation system 600 can include at least one break-away communication connector system 800. The break-away communication connector system 800 can removably couple a peripheral audio presentation system 624 with the integrated audio/video presentation system 600. The break-away communication connector system 800 advantageously facilitates replacement of broken communication jacks, while readily separating from the integrated audio/video presentation system 600 to ensure passenger safety should an emergency arise. In a preferred embodiment, the break-away communication connector system 800 can provide operating power to the peripheral audio presentation system 624. Thereby, powered peripheral audio presentation devices 624, such as noise canceling headphones, can receive the operating power via the break-away communication connector system 800.

The peripheral audio presentation system 624 can comprise any conventional type of audio presentation system, such as headphones, speakers, and/or amplifiers. As shown in FIG. 7A, the peripheral audio presentation system 624 can have a communication cable 628 with a suitable cable length and can be terminated with a peripheral communication connector (or port) 626. The peripheral communication connector 626 can cooperate (or removably couple) with a system communication connector (or port) 622 of the integrated audio/video presentation system 600. The communication connectors 622, 626 are nonfixedly coupled and, if necessary, can readily separate, forming the break-away communication connector system 800. The peripheral audio presentation system 624 and the integrated audio/video presentation system 600 thereby can communicate via the break-away communication connector system 800.

As desired, a conventional audio presentation system, such as a set of headphones, with a standard audio plug can be adapted to cooperate with the break-away communication connector system 800. For example, an interface device (not shown) can provide an interface between the audio plug of the conventional audio presentation system and the system communication connector 622 of the break-away communication connector system 800. The interface device can cooperate with the audio plug of the conventional audio presentation system and can include the peripheral communication connector 626 for coupling with the system communication connector 622. Alternatively, and/or additionally, the conventional audio presentation system can be provided with an audio plug that is configured to cooperate with the break-away communication connector system 800. For the convenience of the user (or passenger) 700 (shown in FIG. 6B), a standard jack likewise may be provided at the passenger seat 382 (shown in FIGS. 4A-B) and/or more than one break-away communication connector system 800 can be associated with the passenger seat 382.

Although shown and described as coupling the peripheral audio presentation system 624 with the integrated audio/video presentation system 600 for purposes of illustration only, the break-away communication connector system 800 can be employed to couple any conventional type of peripheral presentation system, including peripheral video presentation systems and/or handheld user control systems, with the information system 100 and can be disposed on any suitable mounting surface. In other words, if the information system 100 is installed aboard a vehicles 390 (shown in FIGS. 2A-B), the break-away communication connector system 800 can be provided at any suitable passenger cabin surface, such as a seatback 386 (shown in FIGS. 4A-B), an armrest 388 (shown in FIGS. 2A-B), a wall 396 (shown in FIGS. 4A-B), a ceiling, and/or a bulkhead. Exemplary handheld user control systems are shown and described in the above-referenced related non-provisional patent applications: "SYSTEM AND METHOD FOR INTERFACING A PORTABLE MEDIA DEVICE WITH A VEHICLE INFORMATION SYSTEM," Ser. No. 12/210,624, filed Sep. 15, 2008; and "PORTABLE USER CONTROL DEVICE AND METHOD FOR VEHICLE INFORMATION SYSTEMS," Ser. No. 12/210,689, filed Sep. 15, 2008.

Figure 7B:
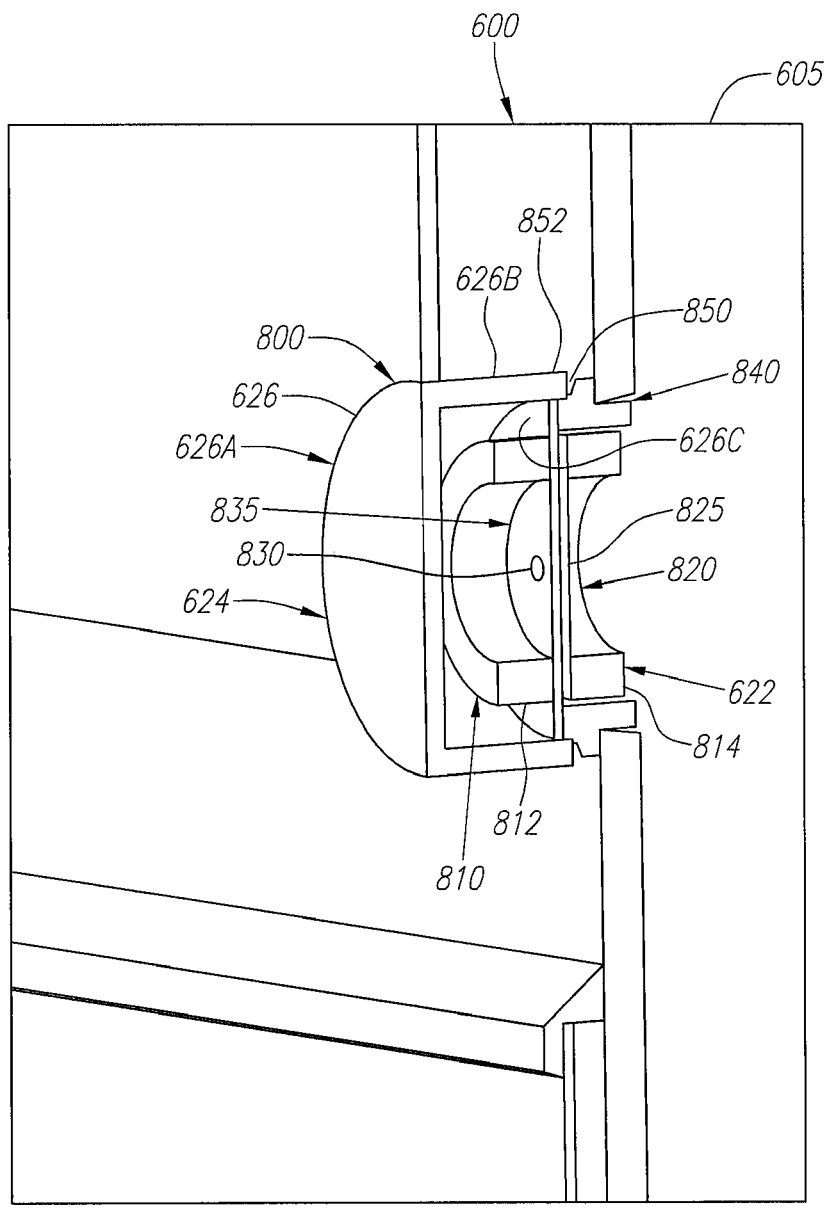
FIG. 7B is an exemplary detail drawing illustrating an embodiment of the break-away communication connector system of FIG. 7A.

The break-away communication connector system 800 preferably employs a magnetic system 810 for providing a magnetic coupling between the communication connectors 622, 626 as illustrated in FIG. 7B. Turning to FIG. 7B, the system communication connector 622 of the integrated audio/video presentation system 600 can include a plurality of system contacts 820 and a system magnet system 814. The system contacts 820 and the system magnet system 814 preferably are disposed within a housing assembly 605 of the integrated audio/video presentation system 600. For example, the system contacts 820 and the system magnet system 814 can be provided within a system bezel 840 recessed within the housing assembly 605.

The peripheral communication connector 626 of the peripheral presentation system 624 similarly can be provided as a plurality of peripheral contacts 830 and a peripheral magnet system 812. When the communication connectors 622, 626 are coupled, the peripheral contacts 830 are configured to cooperate with the system contacts 820; whereas, the system magnet system 814 and the peripheral magnet system 812 are configured to cooperate. As shown in FIG. 7B, the peripheral contacts 830 and the peripheral magnet system 812 can be disposed within a peripheral connector housing 626A. The peripheral connector housing 626A preferably includes at least one mating peripheral mating surface 626B that is configured to cooperate with at least one mating system surface 850 of the housing assembly 605 of the integrated audio/video presentation system 600. Thereby, when the peripheral communication connector 626 is coupled with the integrated audio/video presentation system 600, the mating peripheral mating surface 626B cooperates the mating system surface 850 to help ensure a proper alignment between the system contacts 820 and the peripheral contacts 830 and/or between the peripheral magnet system 812 and the system magnet system 814.

The mating system surface 850, for example, can form a recess (not shown) for receiving the mating peripheral mating surface 626B and/or an extension 852 that can be received within an opening 626C formed by the mating peripheral mating surface 626B as shown in FIG. 7B. As desired, the mating surfaces 626B, 850 can provide via one or more sets of cooperating detents for coupling the peripheral connector housing 626 and the housing assembly 605. The term "detents" refers to any combination of mating elements, such as blocks, tabs, pockets, slots, ramps, locking pins, cantilevered members, support pins, and the like, that may be selectively or automatically engaged and/or disengaged to couple or decouple the peripheral connector housing 626 and the housing assembly 605. It will be appreciated that the cooperating detents as illustrated and described below are merely exemplary and not exhaustive. Accordingly, the break-away communication connector system 800 advantageously supports electrical communication between the peripheral contacts 830 of the peripheral communication connector 626 and the system contacts 820 of the system communication connector 622 while permitting the peripheral communication connector 626 to readily separate from the system communication connector 622 to ensure passenger safety should an emergency arise.

In a preferred embodiment, the system contacts 820 can be provided on a system printed circuit board (PCB) assembly 825, and/or the peripheral contacts 830 can be provided on a peripheral printed circuit board (PCB) assembly 835. The break-away communication connector system 800 thereby can advantageously provide a flat surface-to-surface contact between the communication connectors 622, 626. The PCB assembly 825 and the peripheral PCB assembly 835 can be provided in any convention manner and preferably are provided as flat flexible printed circuit board (PCB) assemblies. If provided as a flat flexible PCB assembly, the peripheral PCB assembly 835 can be used to connect audio conductors within the communication cable 628 (shown in FIG. 7A) to the peripheral communication connector 626 of the peripheral audio presentation system 624. Discrete wiring (not shown) likewise can be used as desired. When the video interface system 362 (shown in FIGS. 4A-B) is provided as a touchscreen display system, for example, the touchscreen display system may need to define an internal physical space to accommodate wiring associated with the system communication connector 622. Use of a flat flexible PCB assembly with the system communication connector 622 advantageously permits the internal physical space to be minimized.

The system contacts 820 of the system communication connector 622 can be disposed on the system PCB assembly 825 in any conventional manner or contact arrangement. Similarly, the peripheral contacts 830 of the peripheral communication connector 626 can be disposed on the peripheral PCB assembly 835 in any conventional manner or contact arrangement. The peripheral contacts 830 are configured to cooperate (or communicate) with the system contacts 820 when the system communication connector 622 and the peripheral communication connector 626 are coupled. In other words, the system contacts 820 of the system communication connector 622 and the peripheral contacts 830 of the associated peripheral communication connector 626 preferably are provided with the same contact arrangement.

Exemplary contact arrangements for the system contacts 820 and the peripheral contacts 830 are illustrated in FIGS. 8A-G. Although shown and described with reference to the system contacts 820 of the system communication connector 622 for purposes of illustration only, the exemplary contact arrangements can equally apply to the peripheral contacts 830 of the peripheral communication connector 626. The exemplary contact arrangements as shown and described herein are not exhaustive and are provided herein for purposes of illustration only and not for purposes of limitation.

Turning to FIG. 8A, the system contacts 820 of the system communication connector 622 can be provided with a concentric (or bull's eye) contact arrangement. The contact arrangement of FIG. 8A includes a central system contact 826 disposed within one or more circular-shaped system contacts 822, 824. The circular-shaped system contacts 822, 824 can be provided with uniform system contact widths as illustrated with system contacts 824 and/or different system contact widths as illustrated with system contacts 822, 824. In other words, the contact arrangement of the system contacts 820 can be provided with any suitable cross-section. As shown in FIG. 8A, selected circular-shaped system contacts 824 can form a single (or continuous) contact in the shape of a complete circle, and/or selected circular-shaped system contacts 822 can comprise two or more contacts 822A, 822B in the shape of a semi-circle. A spacing between adjacent system contacts 822, 824, 826 can be uniform as illustrated in FIG. 8A and/or different as illustrated in FIG. 8B. Thereby, the system communication connector 622 advantageously leverages the continuous contact surfaces of the system contacts 822, 824, 826 of the concentric contact arrangement of FIG. 8A to help ensure that contact is made for each of the system contacts 822, 824, 826.

The system contacts 822, 824, 826 of the concentric contact arrangement shown in FIG. 8A provides sufficient system contacts 820 to support peripheral audio presentation devices 624 (shown in FIG. 7A), including powered peripheral audio presentation devices such as noise-canceling headphones. The system communication connector 622 (shown in FIGS. 7A-B) thereby can provide sufficient system contacts 820 to support the signaling and operating power requirements of the powered peripheral audio presentation device, while leaving the possibility for the device communication connector 626 (shown in FIGS. 7A-B) to be revolved through at least one complete rotation relative to the system communication connector 622 in any direction. The concentric contact arrangement of the system contacts 822, 824, 826 can provide consistent performance for all connector geometries.

The system contacts 820 alternatively, or additionally, can be provided with the concentric (or bull's eye) contact arrangement shown in FIG. 8C. Turning to FIG. 8C, the contact arrangement includes a central system contact 826 disposed within one or more semicircular-shaped system contacts 822, 824 in the manner set forth in more detail above with reference to the contact arrangement of FIG. 8A. As set forth above, the semicircular-shaped system contacts 822, 824 can be provided with uniform system contact widths as illustrated with system contacts 824 and/or different system contact widths as illustrated with system contacts 822, 824. A spacing between adjacent system contacts 822, 824, 826 can be uniform, as illustrated in FIG. 8C, or different as illustrated in FIG. 8D.

The system contacts 822, 824, 826 can be provided with any suitable contact arrangements and/or geometries. For example, FIG. 8E illustrates that a contact arrangement for the system contacts 820, wherein the contact arrangement includes a plurality of straight central system contacts 824 disposed within one or more circular-shaped system contacts 822. The circular-shaped system contacts 822 can be provided in the manner set forth in more detail above with reference to the contact arrangement of FIG. 8A. The straight central system contacts 824 are provided as a parallel arrangement of system contacts 824.

Turning to FIG. 8F, the illustrated contact arrangement includes a central system contact 826 disposed within one or more circular-shaped system contacts 822. A plurality of internal system contacts 824 are shown as being disposed around the central system contact 826 and within the circular-shaped system contacts 822. The internal system contacts 824 can be uniformly disposed about the central system contact 826, as shown in FIG. 8F, and/or unevenly disposed about the central system contact 826. The central system contact 826 and the internal system contacts 824 can be provided with any desired geometrical shape and/or size. As shown in FIG. 8F, for example, the central system contact 826 and the internal system contacts 824 each are provided as round system contacts. The internal system contacts 824 are shown as being provided as pie-shaped system contacts in FIG. 8G.

As desired, a Z-axis film (not shown) can be applied to the break-away communication connector system 800, preferably to the peripheral contacts 830 of the peripheral communication connector 626 (shown in FIGS. 7A-B). The Z-axis film permits electrical signals to pass through the Z-axis film in the Z-axis but inhibits the electrical signals from spreading to adjacent conductors (or contacts or traces). An exemplary Z-axis film is manufactured from PariPoser® material by Paricon Technologies Corporation of Fall River, Mass. The Z-axis film includes highly-organized conductive columns of spherical particles supported in an elastomeric matrix, which provides a compliant interconnection. The PariPoser® material does not take a set and has been tested up to fifty thousand cycles. Advantageously, the PariPoser® material can form a slightly soft layer that can balance out any unevenness. As needed, one or more extra layers of solder can be disposed on the conductors (or contacts or traces) on the peripheral PCB assembly 835 (shown in FIG. 7B) to provide a more even coupling surface on the peripheral PCB assembly 835. The extra layers of solder likewise can add to the aesthetic appearance of the peripheral communication connector 626 by changing the color of the conductors (or contacts or traces) to a silver color.

Figure 9:
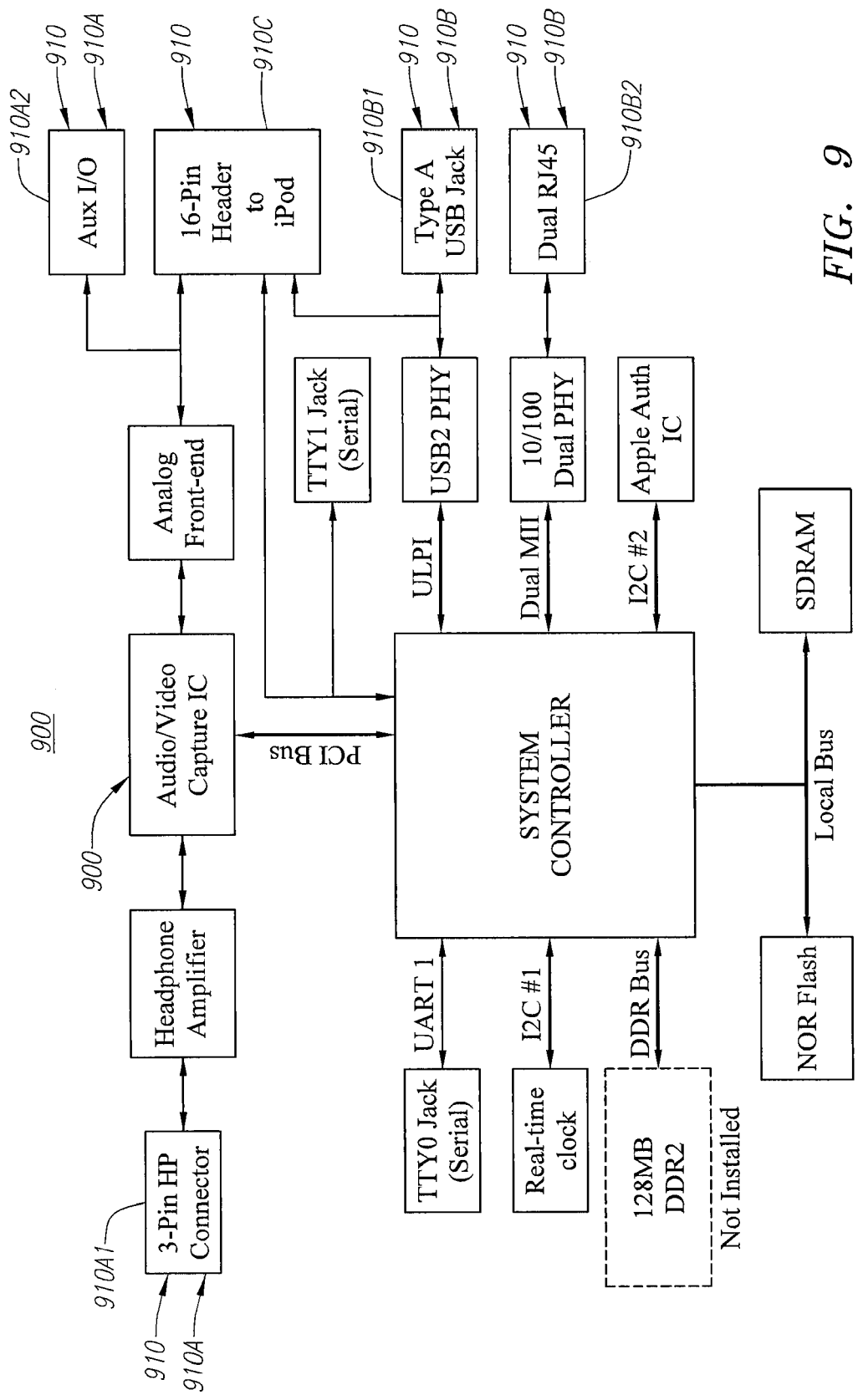
FIG. 9 is an exemplary detail drawings illustrating an embodiment of a hardware architecture for implementing the integrated audio/video presentation system of FIG. 6A.

Turning to FIG. 9, a general hardware (or circuit board) architecture 900 for implementing the integrated audio/video presentation system 600 is shown. The hardware architecture 900 advantageously includes a plurality of user interface systems 910, which enables the hardware architecture 900 to be very adaptable. As desired, one or more of the interface systems 910 can be removed from the hardware architecture 900 for a selected application. As illustrated in FIG. 9, exemplary user interface systems 910 can include one or more audio interface systems 910A, such as a stereo (or monaural) headphone jack (or connectors) 910A1 and/or an auxiliary input/output audio connector 910A2. The user interface systems 910 likewise can have at least one data interface systems 910B. The data interface systems 910B can comprise any conventional data interface system, including an Universal Serial Bus (USB) data interface system 910B1 and/or an Ethernet data interface system 910B2.

One or more of the data interface systems 910B can be configured to communicate with a communication network (not shown). The communication network can be provided as a conventional wired and/or wireless communication network, including a telephone network, a local area network (LAN), a wide area network (WAN), a campus area network (CAN), personal area network (PAN) and/or a wireless local area network (WLAN), of any kind. Exemplary wireless local area networks include wireless fidelity (Wi-Fi) networks in accordance with Institute of Electrical and Electronics Engineers (IEEE) Standard 802.11 and/or wireless metropolitan-area networks (MANs), which also are known as WiMax Wireless Broadband, in accordance with IEEE Standard 802.16. Preferably being configured to support high data transfer rates, the communication network preferably comprises a high-speed Ethernet network, such as any type of Fast Ethernet (such as 100 Base-X and/or 100 Base-T) communication network and/or Gigabit (such as 1000 Base-X and/or 1000 Base-T) Ethernet communication network, with a typical data transfer rate of at least approximately one hundred megabits per second (100 Mbps). To achieve high data transfer rates in a wireless communications environment, free-space optics (or laser) technology, millimeter wave (or microwave) technology, and/or Ultra-Wideband (UWB) technology can be utilized to communicate with selected system resources, the vehicle information system 300, one or more content sources 310 (shown in FIGS. 2A-B), and/or the 310C (shown in FIG. 2B), as desired.

Figure 10:
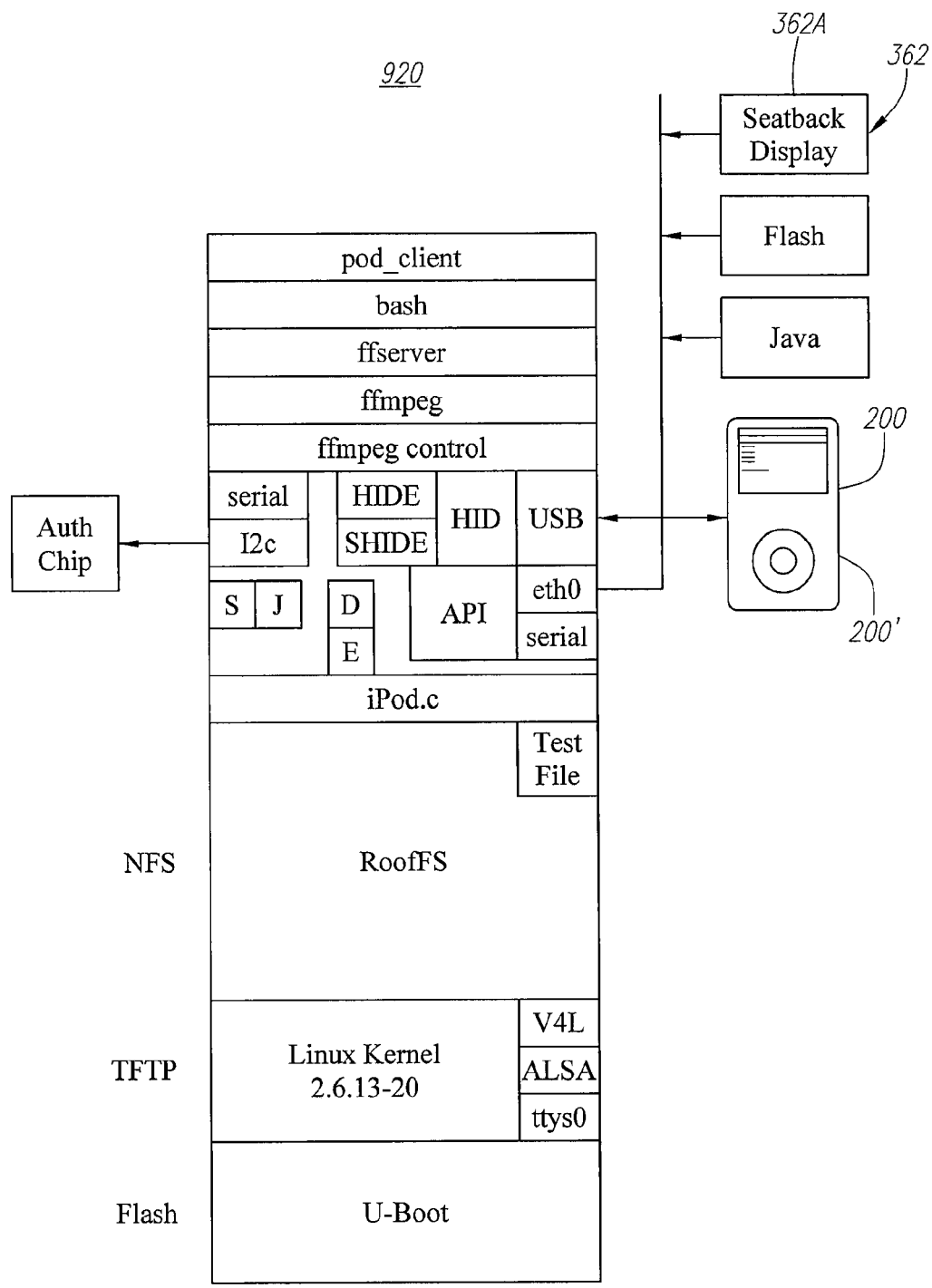
FIG. 10 is an exemplary detail drawings illustrating an embodiment of a software architecture for implementing the integrated audio/video presentation system of FIG. 6A.

The user interface systems 910 likewise can have at least one interface system 910C for coupling the integrated audio/video presentation system 600 with a personal media device 200. As illustrated in FIG. 9, for example, the interface system 910C can couple the integrated audio/video presentation system 600 with an iPod® digital electronic media device 200'. The interface system 910C can be provided in any conventional manner, including in the manner shown and described in the above-referenced "SYSTEM AND METHOD FOR INTERFACING A PORTABLE MEDIA DEVICE WITH A PASSENGER INFORMATION SYSTEM," Ser. No. 12/210,624, filed Sep. 15, 2008. The iPod® digital electronic media device 200' thereby can communicate with the integrated audio/video presentation system 600 in the manner set forth in more detail above. An exemplary software architecture 920 for implementing the integrated audio/video presentation system 600 via the hardware architecture 900 is shown in FIG. 10.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives.

What is claimed is:

1. A user interface system suitable for use with an information system in communication with a content source, comprising:
   an interface system housing;
   an access point for coupling a personal media device with the information system and being disposed upon said interface system housing;
   an input system for selecting among viewing content available from the content source and viewing content available from the personal media device and for controlling a presentation of the selected viewing content, said input system being disposed upon said interface system housing; and
   a presentation system for presenting the selected viewing content and being disposed upon said interface system housing,
   wherein said access point includes a break-away connector system for enabling the personal media device to be coupled with, and readily separated from, said interface system housing, said break-away connector system being disposed within a recessed region of said interface system housing and including a system communication connector for providing a flat surface-to-surface coupling with a peripheral communication connector of the personal media device, said system communication connector and said peripheral communication connector having identical flat contacts on each surface and not being concaved, the break-away connector system further including a system magnet system for providing a magnetic coupling with a peripheral magnet system of the peripheral communication connector.

2. The user interface system of claim 1, wherein said presentation system includes a video presentation system, said input system and said video presentation system being at least partially integrated into a touchscreen display system.

3. The user interface system of claim 1, wherein operation of the personal media device is controlled by said input system.

4. The user interface system of claim 1, wherein said presentation system includes an audio presentation system having a communication connector system.

5. The user interface system of claim 4, wherein said communication connector system includes a second break-away communication connector system having a system communication connector for cooperating with a peripheral communication connector of a peripheral audio presentation system.

6. The user interface system of claim 5, wherein the peripheral audio presentation system is selected from a peripheral group consisting of a headphone, a speaker, and an amplifier.

7. The user interface system of claim 5, wherein the peripheral audio presentation system comprises a powered peripheral audio presentation system, and wherein operating power is provided to said powered peripheral audio presentation system via said system communication connector.

8. The user interface system of claim 7, wherein the powered peripheral audio presentation system is noise canceling headphones.

9. The user interface system of claim 2, wherein said video presentation system receives and presents a menu structure of available viewing content from the personal media device, and wherein said input system selects the selected viewing content via the menu structure.

10. The user interface system of claim 1, wherein the personal media device is selected from a device group consisting of a laptop computer, a palmtop computer, a personal digital assistant, a cellular telephone, a MPEG Audio Layer 3 (MP3) device, an iPod® digital electronic media device, and an iPhone® digital electronic media device.

11. The user interface system of claim 9, wherein the menu structure is a hierarchical menu structure.

12. The user interface system of claim 1, wherein operation of said presentation system is controlled via the personal media device.

13. The user interface system of claim 1, wherein the viewing content from the content source is streamed to the personal media device for presentation.

14. The user interface system of claim 1, wherein said break-away connector system includes a plurality of system contacts cooperating with a plurality of peripheral contacts of the peripheral communication connector.

15. An information system suitable for installation aboard a passenger vehicle, comprising:
    a headend system for providing overall system control functions for the information system and being in communication with a content source;
    a user interface system being provided in accordance with claim 1 and including an interface system housing and a break-away connector system for enabling a personal media device to be coupled with, and readily separated from, said interface system housing; and
    a distribution system for communicating with said headend system and said presentation system.

16. The information system of claim 15, wherein said content source is selected from a group consisting of a local content source that is at least partially incorporated with said headend system and a remote content source that is distant from said headend system.

17. The information system of claim 16, wherein the remote content source provides Internet content to said information system for presentation via said presentation system.

18. The information system of claim 15, wherein said distribution system comprises at least one of a wired distribution system and a wireless distribution system.

19. The information system of claim 15, wherein the information system is suitable for installation aboard an aircraft.

20. An aircraft, comprising:
    a fuselage;
    a plurality of passenger seats arranged within the fuselage; and
    a vehicle information system coupled with said fuselage and being provided in accordance with claim 15, said vehicle information system including a presentation system having an interface system housing and a break-away connector system for enabling a personal media device to be coupled with, and readily separated from, said interface system housing.

21. The aircraft of claim 20, further comprising a storage compartment for storing said personal media device, said storage compartment being disposed at a selected passenger seat.

22. The aircraft of claim 21, wherein said storage compartment is disposed at one of an armrest, a seatback, and a headrest of said selected passenger seat and a predetermined area above the selected passenger seat.

23. The aircraft of claim 20, wherein said presentation system is-disposed at one of an armrest, a seatback, and a headrest of a selected passenger seat.

24. The information system of claim 16, wherein said headend system and the remote content source communicate via a satellite communication system.

25. A user interface system suitable for use with a vehicle entertainment system being suitable for installation aboard a passenger vehicle and being in communication with a content source, comprising:
    a passenger control system for selecting among viewing content available from the content source and for controlling a presentation of the selected viewing content, said passenger control system being disposed upon an interface system housing;
    a presentation system for presenting the selected viewing content and being disposed upon the interface system housing; and
    a break-away connector system being disposed within a recessed region of said interface system housing, said break-away connector system for enabling a peripheral device to be coupled with, and readily separated from, said interface system housing, said break-away connector system including a system communication connector for providing a flat surface-to-surface coupling with a peripheral communication connector of the peripheral device, said system communication connector and said peripheral communication connector having identical flat contacts on each surface and not being concaved.

26. The user interface system of claim 25, wherein said break-away connector system includes a plurality of system contacts and a system magnet system, said system contacts cooperating with a plurality of peripheral contacts of the peripheral communication connector, said system magnet system providing a magnetic coupling with a peripheral magnet system of the peripheral communication connector.

27. The user interface system of claim 26, wherein said system contacts are disposed on a system printed circuit board, and wherein the peripheral contacts are disposed on a peripheral printed circuit board.

28. The user interface system of claim 27, wherein said system magnet system is disposed around said system contacts, and wherein the peripheral magnet system is disposed around the peripheral contacts.

29. The user interface system of claim 26, wherein said system magnet system is disposed about said system contacts, and wherein the peripheral magnet system is disposed about the peripheral contacts.

30. The user interface system of claim 29, wherein said system contacts and the peripheral contacts each include at least one a power contact for providing operating power to the peripheral device and a ground signal contact disposed about said signal contacts.

31. The user interface system of claim 26, wherein said system contacts and the peripheral contacts each include a plurality of signal contacts disposed about a central signal contact.

32. The user interface system of claim 31, wherein said signal contacts comprise straight central system contacts disposed about said central signal contact.

33. The user interface system of claim 31, wherein said signal contacts comprise circular-shaped, semicircular-shaped, or pie-shaped signal contacts in a concentric contact arrangement around said central signal contact.

34. The user interface system of claim 26, wherein the peripheral magnet system and the peripheral contacts are disposed within a peripheral connector housing, and wherein said interface system housing provides at least one mating system surface for cooperating with at least one mating peripheral mating surface of the peripheral connector housing thereby ensuring at least one of a proper alignment between said system contacts and the peripheral contacts and a proper alignment between said system magnet system and the peripheral magnet system when the peripheral device is coupled with said interface system housing.

35. The user interface system of claim 34, wherein said at least one mating system surface of said interface system housing and the at least one mating peripheral mating surface of the peripheral connector housing provide at least one set of cooperating detents for coupling said interface system housing and the peripheral connector housing.

36. The user interface system of claim 25, wherein the peripheral device is selected from a group, consisting of a headphone, a noise canceling headphone, a speaker an amplifier, a personal media device, a laptop computer, a palmtop computer, a personal digital assistant, a cellular telephone, a MPEG Audio Layer 3 (MP3) device, an iPod® digital electronic media device, and an iPhone® digital electronic media device.

37. The user interface system of claim 36, wherein the peripheral device comprises a powered peripheral device, and wherein operating power is provided to said powered peripheral device via said break-away connector system.

38. The user interface system of claim 25, wherein the peripheral device comprises a personal media device, and wherein said passenger control, system selects among the viewing content available from the content source and viewing content available from the personal media device for presentation.

39. A method for integrating a peripheral device with a vehicle entertainment system being suitable for installation aboard a passenger vehicle and being in communication with a content source, comprising:
providing a user interface system having a passenger control system for selecting among viewing content available from the content source, a presentation system for presenting the selected viewing content, and a break-away connector system for enabling the peripheral device to be coupled with, and readily separated from, an interface system housing, the passenger control system, the presentation system, and the break-away connector system each being disposed upon the interface system housing of the presentation system, said break-away connector system including a system communication connector for providing a flat surface-to-surface coupling with a peripheral communication connector of the peripheral device, said system communication connector and said peripheral communication connector having identical flat contacts on each surface and not being concaved; and
permitting the peripheral device to be coupled with the presentation system via the break-away connector system.

40. The method of claim 39, wherein said providing a user interface system includes providing a communication cable for coupling the peripheral device with the break-away connector system.

41. The method of claim 39, wherein said permitting the peripheral device to be coupled with the presentation system comprises permitting a personal media device to be coupled with the presentation system via the break-away, connector system.

42. The method of claim 41, further comprising integrating the personal media device with the vehicle entertainment system such that the passenger control system is enabled to select among the viewing content available from the content source and viewing content available from the personal media device.

43. The method of claim 42, wherein said integrating the personal media device with the vehicle entertainment system includes enabling operation of the personal media device to be controlled via the passenger control system.

44. The method of claim 42, wherein said integrating the personal media device with the vehicle entertainment system includes enabling operation of the vehicle entertainment system to be controlled via the personal media device.

45. A method for manufacturing a vehicle information system, comprising:
providing a headend system for providing overall system control functions for the vehicle information system and for communicating with a content source;
providing an interface system housing;
disposing a passenger control system on said interface system housing, said passenger control system for selecting among viewing content available from the content source and for controlling a presentation of the selected viewing content;
disposing a presentation system on said interface system housing, said presentation system for presenting the selected viewing content;
disposing a break-away connector system on said interface system housing, said break-away connector system for enabling a peripheral device to be coupled with, and readily separated from, the interface system housing, said break-away connector system including a system communication connector for providing a flat surface-to-surface coupling with a peripheral communication connector of the peripheral device, said system communication connector and said peripheral communication connector having identical flat contacts on each surface and not being concaved, the break-away connector system further including a system magnet system for providing a magnetic coupling with a peripheral magnet system of the peripheral communication connector; and
coupling said presentation system with said headend system via a distribution system.

46. The method of claim 45, wherein said coupling said presentation system with said headend system includes coupling said presentation system with said headend system via at least one of a wired distribution system and a wireless distribution system.

47. The method of claim 45, further comprising installing the vehicle information system aboard a passenger vehicle having a plurality of passenger seats.

48. The method of claim 47, wherein said installing the vehicle information system aboard the passenger vehicle includes disposing said presentation system at one of an armrest, a seatback, and a headrest of a selected passenger seat.

49. The method of claim 47, wherein said installing the vehicle information system aboard the passenger vehicle includes disposing an access point of said distribution system at one of an armrest, a seatback, and a headrest of a selected passenger seat and a predetermined area above the selected passenger seat.

50. The method of claim 47, wherein said installing the vehicle information system aboard the passenger vehicle includes at least one of installing a local content source aboard the passenger vehicle and installing an antenna system and a transceiver system aboard the passenger vehicle, said antenna system and said transceiver system for enabling the vehicle information system to communicate with a remote content source.

* * * * *